United States Patent
Wyrobek et al.

(10) Patent No.: US 10,328,805 B1
(45) Date of Patent: Jun. 25, 2019

(54) BATTERY MANAGEMENT SYSTEM FOR ELECTRIC VEHICLES

(71) Applicant: Romotive, Inc., San Francisco, CA (US)

(72) Inventors: Keenan Wyrobek, Half Moon Bay, CA (US); James Laird Martz, III, Belmont, CA (US); Keller Rinaudo, Menlo Park, CA (US)

(73) Assignee: ZIPLINE INTERNATIONAL INC., San Francisco, CA (US)

( * ) Notice: Subject to any disclaimer, the term of this patent is extended or adjusted under 35 U.S.C. 154(b) by 582 days.

(21) Appl. No.: 14/872,974

(22) Filed: Oct. 1, 2015

Related U.S. Application Data

(60) Provisional application No. 62/208,525, filed on Aug. 21, 2015.

(51) Int. Cl.
  *H02J 7/00* (2006.01)
  *B60L 11/18* (2006.01)

(52) U.S. Cl.
  CPC ....... *B60L 11/1809* (2013.01); *B60L 11/1861* (2013.01)

(58) Field of Classification Search
  CPC .................. B60L 11/1809; B60L 11/1861
  USPC .................................... 320/109, 134–136
  See application file for complete search history.

(56) References Cited

U.S. PATENT DOCUMENTS

| | | | |
|---|---|---|---|
| 5,790,976 A * | 8/1998 | Boll | B60L 3/12 180/65.8 |
| 9,233,620 B2 * | 1/2016 | Hara | B60L 11/1818 |
| 2015/0239365 A1 * | 8/2015 | Hyde | B60L 11/1861 701/2 |
| 2016/0064960 A1 * | 3/2016 | DiCarlo | H02J 7/007 320/134 |

\* cited by examiner

*Primary Examiner* — Richard V Muralidar
(74) *Attorney, Agent, or Firm* — Brownstein Hyatt Farber Schreck, LLP

(57) ABSTRACT

An electric vehicle system includes a battery management system that optimizes the performance and useful life of vehicle batteries by selecting the optimal batteries in an inventory for each electric vehicle mission based on the mission energy requirements, the energy storage capacities of batteries, and the predicted performance degradation of batteries.

7 Claims, 8 Drawing Sheets

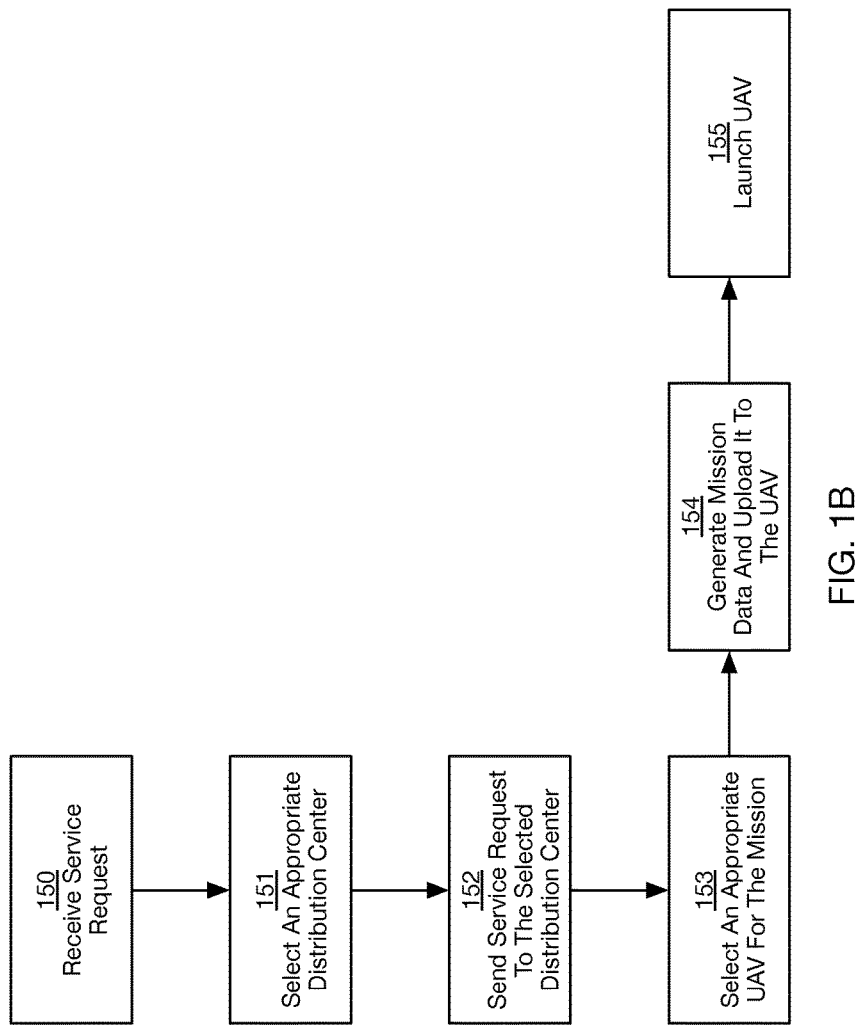

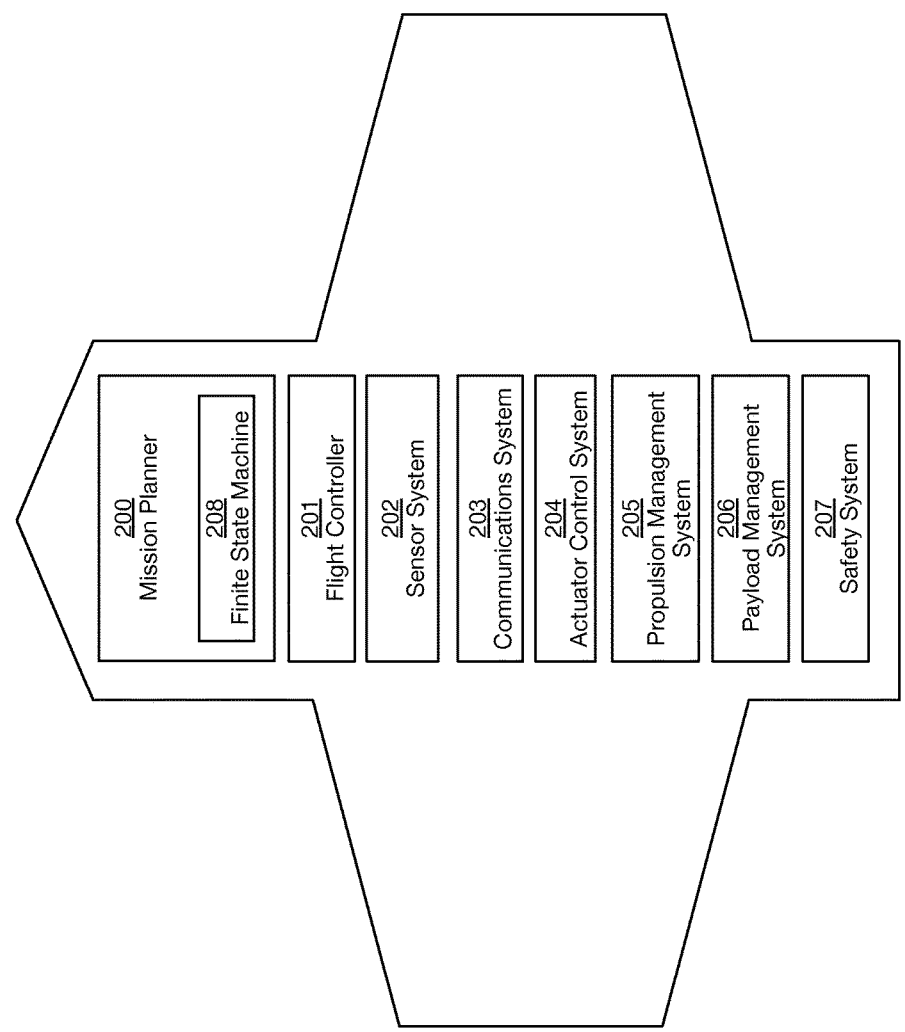

BATTERY MANAGEMENT SYSTEM FOR ELECTRIC VEHICLES

CROSS-REFERENCE TO RELATED APPLICATION

This application is a non-provisional patent application of and claims the benefit to U.S. Provisional Patent Application No. 62/208,525, filed Aug. 21, 2015, and titled "Battery Management System for Electric Vehicles," the disclosure of which is hereby incorporated herein by reference in its entirety.

TECHNICAL FIELD

This disclosure relates generally to battery management systems for electric vehicles, and, in particular, systems for managing the replaceable batteries in autonomous electric aerial vehicles.

BACKGROUND

Electric vehicles have been gaining popularity in the last few decades. While electric powered cars have grabbed the spotlight, there has also been a huge increase in the popularity of battery-powered Unmanned Aerial Vehicles (UAVs). These electric UAVs are used not only by hobbyists and recreational flyers, but also by governments and businesses, for purposes such as surveillance, mapping, and most recently, aerial delivery.

SUMMARY

Embodiments discussed herein are related to methods and systems for managing rechargeable and replaceable batteries used in electric vehicles to minimize battery capacity degradation and improve efficiency.

One embodiment of a battery management system includes a battery monitoring system and a battery manager. The battery monitoring system determines battery properties for each of a plurality of batteries. The battery manager is configured to receive mission information for an electric vehicle, determine a mission energy requirement based on the mission information, and receive the battery information from the battery monitoring system. It determines a predicted capacity degradation for each of the plurality of batteries based on the received battery information and the mission energy requirement and selects one or more batteries to be coupled to the electric vehicle based on the predicted capacity degradation and the mission energy requirement.

One embodiment of a method for selecting a battery for an electric vehicle comprises electronically receiving mission information describing a route to be travelled by the electric vehicle and electronically determining a mission energy requirement for the electric vehicle based at least partially on the mission information. A battery from a plurality of batteries is selected based on at least an energy storage capacity of the battery and the mission energy requirement.

The method may also select a battery based on a predicted capacity degradation of the battery, which may be determined based on a computer model that takes a charge level of the battery and the mission energy requirement as input parameters.

BRIEF DESCRIPTION OF THE DRAWINGS

The figures use like reference numerals to identify like elements. A letter after a reference numeral, such as "100a," indicates that the text refers specifically to the element having that particular reference numeral. A reference numeral in the text without a following letter, such as "100," refers to any or all of the elements in the figures bearing that reference numeral (e.g. "100" in the text refers to reference numerals "100a" and/or "100b" in the figures).

FIG. 1B is a diagram illustrating a UAV launch process, according to one example embodiment.

FIG. 2A is a diagram illustrating components of a UAV, according to one example embodiment.

DETAILED DESCRIPTION

Figure 1A:
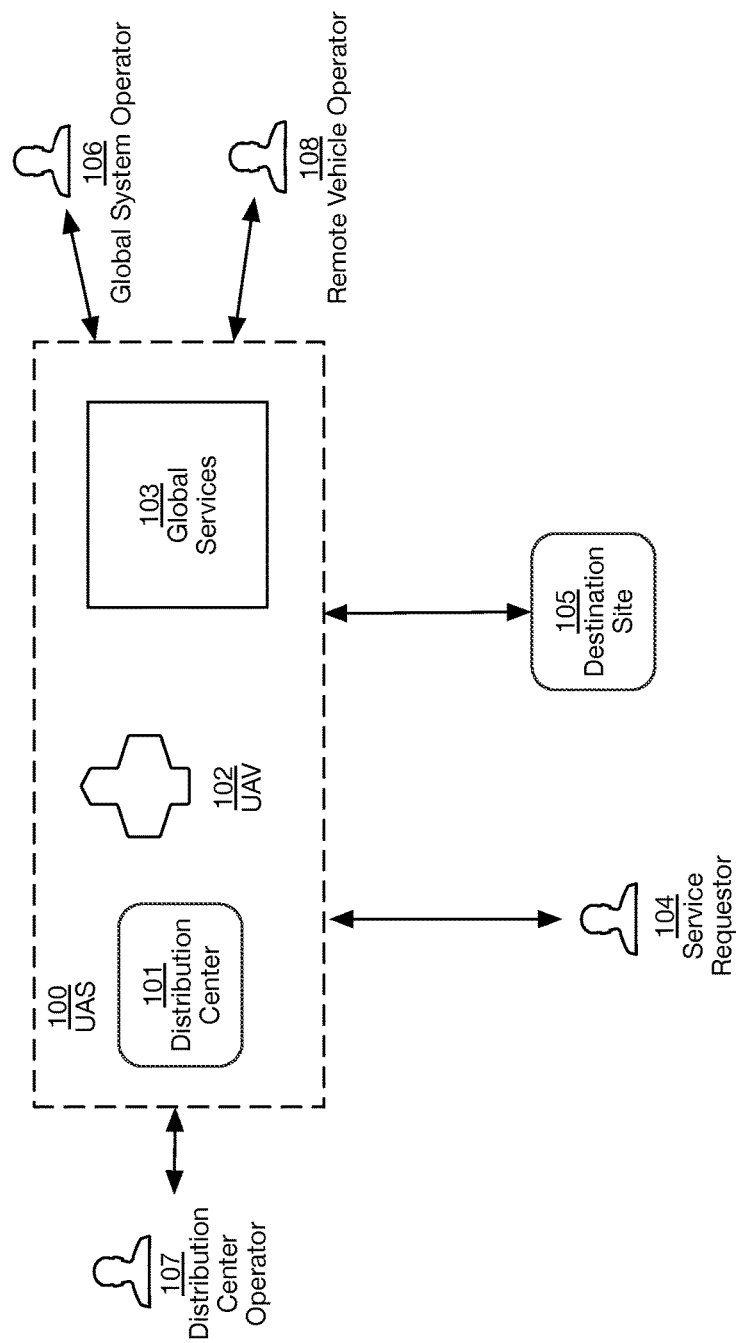
FIG. 1A is a diagram illustrating components of an unmanned aerial system (UAS) and entities that may interface with it, according to one example embodiment.

While the present disclosure has been described with reference to various embodiments, it will be understood that these embodiments are illustrative and that the scope of the disclosure is not limited to them. Many variations, modifications, additions, and improvements are possible. Modules and procedures may be separated or combined in different ways in various embodiments, or described with different terminology. Moreover, embodiments are not mutually exclusive, and characteristics, steps, systems, or other aspects of any embodiment may be combined with any those of any other embodiment, regardless of whether those embodiments were discussed together or otherwise indicated to be a single embodiment. Moreover, characteristics, steps, systems, or other aspects that are described as a single embodiment may be omitted from that embodiment. These and other variations, modifications, additions, and improvements may fall within the scope of the disclosure as defined in the claims that follow.

This document describes an electric vehicle system for monitoring and managing electric vehicles, including a battery management system to manage the batteries used by the electric vehicles in order to optimize system efficiency.

In particular, as the popularity of electric vehicles has increased, the problems and limitations of rechargeable electric batteries have become more apparent. Systems using rechargeable batteries face many hurdles, including both battery expense and battery capacity degradation. Although battery cost has been falling in recent years, battery expense is still a major factor in the cost of many electric vehicles.

Battery capacity degradation is the reduction in the amount of energy that a given rechargeable battery can store, which occurs when the battery is repeatedly charged and discharged over a period of time. Since electric motors typically have fewer moving parts than internal combustion engines, battery degradation is often the major factor in the depreciation of electric vehicles.

In this disclosure, the system for monitoring and managing electric vehicles and their batteries is primarily illustrated by way of a practical embodiment in the form of an Unmanned Aerial System (UAS) that operates fixed-wing electric UAVs. But alternative embodiments using different electric vehicles (both autonomous and manually operated) may also be practical, such as electric automobiles, electric boats, etc.

Unless otherwise noted, the present description of the autonomous vehicle system in connection with the UAS applies equally to other forms of vehicles. Nevertheless, details that apply to other forms of electric vehicles may be noted where they are helpful or illustrative.

The UAS system described herein provides a platform for performing various target functions, including, but not limited to, package delivery, data capture, mapping, surveillance, and infrastructure provisioning. While specific embodiments of the UAS system are described herein, some embodiments may comprise systems and methods that are not generally relevant to every target function. One skilled in the art will readily recognize the relevance of a recited system or method in relation to the target functions.

Unmanned Aerial System (UAS)

The UAS disclosed in this document is an example implementation of an electric vehicle system with a battery management system designed to optimize the use of vehicle batteries. In this embodiment the electric vehicle system corresponds to the UAS, while the individual electric vehicles correspond to fixed-wing UAVs. Moreover, as used herein, the term "autonomous" may refer to operations of an unmanned vehicle that are performed by the vehicle without user intervention and/or control, as well as to describe vehicles that are designed to operate without human intervention and/or control for all or portions of their missions. Accordingly, a vehicle and/or a system may be described as autonomous even though a human operator may choose to override the vehicle's autonomous control.

FIG. 1A illustrates an embodiment of a UAS and interfacing entities. In this embodiment, the UAS 100 receives a service request from a service requestor 104 and deploys a UAV 102 to fulfill that request. In the event that the UAV 102 encounters a situation that its onboard automation cannot understand or handle (or a human operator becomes aware of a situation that warrants human intervention), the UAS 100 is able to provide human intervention by selecting a remote vehicle operator 108 who can issue commands to the UAV 102. In this embodiment, the UAS 100 comprises a distribution center 101, a UAV 102, and global services 103.

The service requestor 104 is a human user or an autonomous system that issues a service request to the UAS 100. In the case where the service requestor 104 is a human user, that user may use a remote client device such as a mobile phone, tablet, or personal computer to issue the request. A service request is an instruction to the UAS 100 to provide some service at the destination site 105. The destination site 105 may be any designated location, such as a portion of open ground, a building, a mailing address, a global positioning system (GPS) coordinate, or a slice of airspace. In some embodiments, the destination site 105 is the location of a beacon device. The beacon device may be any device that emits a signal that can be used to track or identify a location, such as for example a transponder, a mobile phone, etc. The destination site 105 may also be designated by identifying a particular object, such as, for example, a designated vehicle, a mailbox, a delivery pad, or some other target object that can be tracked to indicate a target location for a service. In another embodiment, the destination site 105 is the location of the service requestor 104, although this need not be the case. Although one service requestor 104 and one destination site 105 are illustrated in this embodiment, in practice there can be many service requestors 104 and destination sites 105.

The requested service may be any service that can be provided from an airborne platform. For example, in one embodiment, the service request issued by the service requestor 104 is a request to deliver a package containing a specific payload to the destination site 105. In another embodiment, the service request is a request to capture image data using a camera mounted on the UAV 102, at the destination site 105 or along a route to and from the destination site 105. In yet another embodiment, the service request is a request to provide an Internet access point at the destination site 105 using a Wi-Fi gateway mounted on the UAV 102. Many other services can be provided using the UAS 100 at the destination site 105, such as package pickup, surveillance, mapping, data capture using UAV-mounted instruments, etc.

The UAV 102 is an Unmanned Aerial Vehicle. The UAV 102 can be implemented using a variety of systems and airframes. Almost any practical flying platform can be used as the vehicle base for the UAV 102, including gliders, airplanes, balloons, helicopters, etc. In one embodiment, the UAV 102 is implemented using a fixed-wing aircraft with redundant propulsion systems that is optimized for long-range flight. In another embodiment, the UAV 102 is implemented using a quad-rotor aircraft that is optimized for short-range flight and vertical takeoff and landing. In yet another embodiment, the UAV 102 is implemented using a hybrid fixed-wing aircraft, with engines or motors that can be tilted, capable of both long-range flight and vertical takeoff and landing. In another embodiment, the UAV 102 is implemented using a fixed-wing aircraft with fixed horizontally oriented motors (e.g., electric motors) and/or engines (e.g., reciprocating or turbine engines), configured to provide horizontal thrust, and separate fixed vertically oriented engines or motors configured to provide vertical thrust. For simplicity, the UAVs described herein are described as being equipped with motors. However, this is not intended to limit the descriptions and concepts set forth herein to motors, and any description relating to motors may apply to engines as well. The UAV 102 may also be implemented using a lighter than-air-platform such as a balloon, blimp, or other dirigible. One purpose of the UAV 102 in the UAS 100 is to serve as a flexible platform that can be rapidly deployed on demand, with minimum human involvement.

Although the UAV 102 is an autonomous vehicle that is designed to operate without human assistance in most scenarios, it may occasionally require the intervention of a human controller or pilot. For instance, a global systems operator 106 or a distribution center operator 107 may issue a recall command to the UAV 102 while it is on a mission, due to some external issue, such as inclement weather, a canceled delivery, etc. The UAV 102 may also proactively request human assistance while it is on its mission. For example, the UAV 102 may encounter an environment where its vision and/or navigation algorithms cannot produce a path with a high degree of reliability. In such a scenario, the UAV 102 will send a request for assistance to the global services 103. The global services 103 will select a remote vehicle operator 108 to handle the situation, and that operator can send the UAV 102 one or more commands to help it navigate its environment.

The UAV 102 may carry any suitable payloads, depending on the nature of the service request received from the service requestor 104. Components of the UAV 102 are explained in more detail in the description for FIG. 2. Although a single UAV 102 is depicted in FIG. 1, there may be more than one UAV 102 in a UAS 100.

The distribution center 101 is a fixed or mobile facility that facilitates the launch, recharge, communications, repair, and payload logistics for the UAV 102. The distribution center 101 is explained in further detail in the description for FIG. 3A. Although a single distribution center 101 is shown in FIG. 1A, there may be more than one distribution center 101 in the UAS 100. In one embodiment, each UAV 102 in the UAS 100 is based at a single distribution center 101, and is repaired, reloaded, and recharged at that distribution center 101. In another embodiment, each UAV 102 can be repaired, reloaded, and recharged at any distribution center 101 in the UAS 100, and UAVs 102 may be routed between distribution centers 101 based on the logistical requirements of current service requests and the projected requirements for future service requests. Each distribution center 101 may have a launcher system that is capable of automated, reliable, high-volume launches of UAVs 102.

The global services 103 may be comprised of one or more computer server systems, running software services (i.e. computer software programs), accessible through the Internet, which provide offsite support, administration, air traffic control, communications, data storage and logistics functions for the distribution centers 101 and the UAVs 102. In one embodiment, the global services 103 route a service request from a service requestor 104 to a distribution center 101 that is geographically adjacent to (or in relative geographic proximity to) the destination site 105.

The global services 103 may also receive requests for assistance from the UAV 102 while it is on its mission. Based on such requests, the global services 103 will select a remote vehicle operator 108 from a pool of operators, and provide data about the UAV 102's environment to the remote vehicle operator 108. Based on this provided data, the remote vehicle operator 108 can provide one or more commands to the UAV 102 to help it surmount any problems that its on-board intelligence cannot handle. The global services 103 are explained in more detail in the description for FIG. 4.

The global system operator 106 may be a human user that monitors and operates the UAS 100 to ensure the correct and efficient functioning of the system. For example, in some embodiments, the global system operator 106 may monitor the UAS 100 through the computer servers of the global services 103, to ensure that a distribution center 101 has the appropriate payload in stock to fulfill a service request from a service requestor 104. In one example embodiment, the global system operator 106 may use the global services 103 to route new stock of a particular payload to a distribution center 101 in anticipation of that payload stock being depleted.

There may be more than one global system operator 106, and the global system operators 106 may monitor and provide services for multiple distribution centers 101, UAVs 102, and service requestors 104.

The distribution center operator 107 is a human user that monitors and operates the distribution center 101. The distribution center operator 107 may ensure that the UAS 100 components that are local to the distribution center 101 function correctly. This includes the UAVs 102 based at the distribution center 101, as well as other components such as launchers, rechargers, payloads, etc. The distribution center 101 provides systems and methods to facilitate the tasks of the distribution center operator 107. For example, in some embodiments, the distribution center operator 107 operating a distribution center 101 is provided with an operator interface that allows her to determine the inventory of each type of payload at that distribution center 101, and that enables her to order more of any type of payload that is in short supply. The distribution center operator 107 may also operate the launcher system located at that distribution center 101. Operating the launching system may include loading UAVs 102 onto the launcher in preparation for launch, as well as monitoring the launcher via the operator interface. The distribution center systems and methods that facilitate the distribution center operator 107's work are explained in more detail in the description for FIG. 3A.

The remote vehicle operator 108 is a human user that receives information about the UAV 102 from the global services 103 and may issue commands to the UAV 102 to help it complete its mission. In one embodiment of the system there is a pool of available remote vehicle operators 108 that can provide assistance to any UAV 102 in the system. When the global services 103 receive a request for assistance from a UAV 102, it selects from among the available remote vehicle operators 108 and routes the request to that operator. The remote vehicle operator 108 reviews information about the circumstances of the UAV 102 and sends one or more commands to the UAV 102. Based on these commands, the UAV 102 takes actions that help it to complete its mission. In one embodiment, the roles of the global system operators 106 and the remote vehicle operators 108 are merged.

FIG. 1B illustrates one embodiment of a UAV launch process implemented by the UAS 100. As an initial step the global services 103 of the UAS 100 receive 150 a service request from a service requestor 104. The service request specifies a destination site 105, which designates the location where the service is to be delivered. As described herein, the service request may also include payload information, corresponding to a payload requested by the service requestor. The global services 103 then select 151 a suitable distribution center 101 from which to fulfill the service request. In some embodiments, the global services 103 select 151 the distribution center 101 from which to fulfill the service request by determining the distribution center 101 that is closest to the location of the destination site 105. In another embodiment, the global services 103 select 151 a distribution center 101 to fulfill the service request by taking into account both the proximity of the distribution center 101 to the destination site 105 as well as an inventory at the distribution center 101 that indicates the availability of a payload specified in the service request. For example, if the service request is a request to deliver a specific type of item to the destination site 105, the global services 103 will select the distribution center 101 from those distribution centers that are near the destination site 105 and have the requested item in their inventory. Other factors can also be used to select a distribution center 101, such as, for example, the local weather conditions and air traffic at the distribution centers 101.

Once a distribution center 101 is selected 151, at least a portion of the information in the service request is sent 152 to that distribution center 101. In addition to the destination site location and payload information, the service request may contain other information that is useful at the distribution center 101 for the fulfillment of the service request. For example, in some embodiments, the service request further comprises a time designating when the service request should be fulfilled at the destination site 105.

A UAV 102 can be selected 153 to fly a mission to fulfill the request, either during the distribution center selection process or afterwards. The UAV 102 that will fly the mission may be selected 153 based on one or more criteria that are relevant to the service request and/or system efficiency. For example, in one embodiment, the UAV 102 is selected 153 based on the charge level of its battery and the distance to the destination site 105. In another embodiment, the UAV 102 is selected 153 based on the instruments that are installed on its airframe and a type of data capture specified in the service request. In yet another embodiment, the UAV 102 is selected 153 based on a package in its payload matching a package specified for delivery in the service request.

In an alternative embodiment, the UAS 100 does not select from pre-configured UAVs for a given mission. Instead, either the distribution center 101 or the global services 103 determine a set of components that are required to complete the service request, and the distribution center 101 causes a UAV comprising the required components to be assembled for the mission. For example, if the destination site 105 is a certain distance from the distribution center 101, the UAV for the mission can be configured with a suitable battery pack and motors to complete a round-trip flight to that destination.

The selection 153 of the UAV 102 may occur after the selection 151 of the distribution center, or may be used as a factor in selecting 151 the distribution center 101. For example, the distribution center 101 may be selected 151 from only those distribution centers that have a particular type of UAV airframe, UAV battery, or UAV motor, based on the weight of a payload required by the service request.

Once the UAV 102 is selected 153 for the mission, mission data is generated 154 for it. The mission data is information that enables the UAV 102 to navigate to the destination site 105 and fulfill the service request. In some embodiments, the mission data includes GPS coordinates for the destination site 105 as well as flight corridor information facilitating navigation to those GPS coordinates. The flight corridor information is discussed in more detail in the descriptions for FIG. 2A and FIG. 3A. Further details related to the mission data are discussed in the descriptions for FIG. 2A, FIG. 3A, and FIG. 4. After the mission data is generated 154, it is uploaded into a database on the UAV 102.

Once the mission data is generated and uploaded 154, the UAV 102 is launched 155. From the time the UAV 102 is launched and until it lands again, it is considered to be on a mission to complete the service request. In one embodiment, the UAV 102 may be launched with a mission to fulfill more than a single service request. In another embodiment, at least a part of the mission data is uploaded and perhaps even generated, after the UAV 102 is launched 155.

Unmanned Aerial Vehicle (UAV)

In this disclosure, the embodiment of the electric vehicle system described is a UAS 100, where the individual electric vehicles are UAVs 102.

FIG. 2A is a block diagram of a UAV 102 according to one example embodiment. The UAV 102 is an aircraft system with hardware and software modules that enable it to fulfill service requests with little or no human supervision. In one embodiment, the UAV 102 is comprised of a commercially available airframe that is modified to include additional hardware and software modules that enable it to fly autonomously and complete a service request. In another embodiment, the UAV 102 is comprised of a purpose-built airframe with integrated hardware and software modules that enable autonomous operation. The embodiment of the UAV 102 illustrated in FIG. 2A comprises a mission planner 200, a flight controller 201, a sensor system 202, a communications system 203, an actuator control system 204, a propulsion management system 205, a payload management system 206, and a safety system 207. In an embodiment of the UAV 102, two or more of the modules mentioned above may be combined into a single hardware component to reduce complexity, improve reliability, reduce weight, and/or reduce cost. For instance, in one example embodiment, the mission planner 200 and the flight controller 201 may be implemented using software modules that run on the same System On Chip (SOC) hardware.

Although not depicted in the figure, the modules of the UAV 102 are interconnected via at least one communications bus. The bus allows the modules to communicate with each other to receive and send information and commands. The bus may be implemented using any of the methods known to those with familiarity in aviation and vehicle engineering. For example, the bus may be implemented using the Controller Area Network (CAN) standard. To improve the reliability of the system, embodiments may use additional redundant buses. For example, a dual-CAN bus can be implemented to prevent a bus failure from causing the UAV to lose control.

The mission planner 200 is a module that provides the other modules of the UAV 102 with high-level directives and goals; the execution of these directives and goals causes the UAV 102 to fulfill a service request. The goals and directives produced by the mission planner 200 are communicated to the other modules of the UAV 102, which may then take other actions to complete a mission, including the generation of additional directives and goals for other modules of the system.

For instance, in one embodiment, the mission planner 200 determines a set of waypoints that the UAV 102 may traverse in order to reach a destination site 105, and provides the location of a first waypoint to the flight controller 201 as a goal, along with a directive to fly to that location. In this embodiment, the flight controller 201 may then, in turn, compute the orientation and propulsion needed to move the UAV 102 towards the goal location; the flight controller 201 may also generate further directives for other modules, such as, for example, for the actuator control system 204 and for the propulsion management system 205. The directives sent to the actuator control system 204 and the propulsion management system 205 may cause them to take actions that change the orientation of the UAV 102 and propel it towards the goal location. As a result of the actions taken by various modules in the UAV 102 in response to the directives and goals of the mission planner 200, the UAV 102 will fly to the designated first waypoint. Once that goal is achieved, the mission planner 200 may send new goals and directives to the other modules, such that the UAV 102 flies to a second waypoint, and a third waypoint, and so on, until the higher-level goal of reaching the destination site 105 is fulfilled.

Besides movement directives, the mission planner 200 may issue other directives to the modules of the UAV 102 that cause actions such as dropping of a payload, capturing of image data, transmitting of data, etc. The mission planner 200 may also receive commands from the global services 103, from human operators, or from third-party controllers (such as air traffic controllers), and may issue directives to the UAV 102 modules based on these commands. For instance, in one example embodiment, the mission planner 200, on board a UAV 102, may receive a command from a human operator to fly back to a distribution center 101 due to an approaching storm. In response to this command, the mission planner 200 will produce new goals and directives that are sent to other modules in the UAV 102, and as a result of these new goals and directives, the UAV 102 will change course and return to the distribution center 101.

In one embodiment, the mission planner 200 comprises a finite state machine 208. The finite state machine 208 is a data structure that organizes when and under what circumstances the mission planner 200 issues goals and directives to the other components of the UAV 102, during the course of the UAV 102's mission. Conceptually, the finite state machine 208 comprises a plurality of vehicle states and corresponding valid transitions between those states. At least one of the vehicle states is active at all times during the UAV 102's mission. The mission planner 200 broadcasts goals and directives, over the communications bus, to the other modules of the UAV 102, based on the current vehicle state. The finite state machine 208 transitions from one vehicle state to another vehicle state as the mission progresses, and when the finite state machine 208 enters a new vehicle state, the mission planner 200 may broadcast new goals and directives to the other modules of the UAV 102. For example, in one embodiment, the UAV 102 includes the vehicle states: launch, nominal flight, hold position, deliver package, return, and landing. In this embodiment, the mission planner 200 may begin the mission in the launch state. In the launch state the mission planner may give the flight controller 201 the goal of making the UAV 102 take off. Based on that goal, the flight controller 201 may increase the thrust provided by the motors and may lower the flaps on the wings by issuing directives to the actuator control system 204 and the propulsion management system 205. Once the vehicle is airborne, the finite state machine 208 may transition to the nominal flight state. In the nominal flight state, the mission planner 200 may send the flight controller 201 a directive to fly to a particular goal destination. Once the UAV 102 reaches the destination, the finite state machine 208 may transition to the deliver package state. Based on the deliver package state, the mission planner 200 may send directives to both the flight controller 201 and the payload management system 206, such that the destination site is safely approached, and the payload is released.

The finite state machine 208 may be represented using a variety of different data structures and can be implemented using a variety of hardware, software, or hybrid hardware-software methods. In one embodiment the finite state machine 208 is implemented by creating a technical specification defining the vehicle states and valid state transitions, and then compiling the technical specification to produce an executable or object code that represent the defined states and transitions. In this embodiment, the executable or object code can be stored in a computer storage medium—such as random access memory, hard disc storage, flash memory— in the UAV 102. In another embodiment the technical specification may be translated into a hardware design that can be implemented using one or more hardware modules.

The mission planner 200 is provided with mission data prior to the launch of the UAV 102 from the distribution center 101. The mission data includes information that enables the mission planner 200 to locate the destination site 105, to determine an appropriate route to that location, and to perform any request-specific actions required to complete the service request. For example, in some embodiments, the mission planner 200 is provided with a destination location, a route to the destination location, and a series of points along the route where images are to be captured with an on-board camera.

In some embodiments, the mission data includes a local skymap for an area of operation. The area of operation is a geographic region that encompasses the distribution center 101 and the destination site 105. The local skymap includes information about a plurality of flight corridors within the area of operation. In some embodiments, the local skymap is generated from a global skymap, which contains information about flight corridors within a wider geographic area, by selecting the information in the global skymap that pertains to flight corridors within the area of operation.

A flight corridor is an area of airspace that is designated by the UAS 100 for UAV flight. The local conditions in a flight corridor may be monitored by the UAS 100, and the flight corridors may be used by the UAVs 102 to travel safely and efficiently between locations. The local skymap comprises information about each of a plurality of flight corridors. The information about each flight corridor may include, but is not limited to, data about the flight corridor's location, local wind conditions, local air traffic (i.e. other UAVs and aircraft within the flight corridor), precipitation, aerial hazards, geographic obstacles (e.g. Mountains), etc.

Using the information in the skymap, the mission planner 200 develops a dynamic route from the distribution center 101 to the destination site 105, prior to launch or soon after launch. The dynamic route takes into account the goals of the mission as well as the requirement of the UAV 102 to return to a distribution center 101 after fulfilling the service request. In some embodiments, the mission planner 200 receives a pre-generated route from the distribution center 101 or the global services 103, and modifies that route only as conditions in the skymap change over time.

The dynamic route is a sequence of flight corridors that the UAV 102 may traverse to fly from its present location to some goal location. As the UAV 102 flies its mission, it may receive updates to the skymap from the UAS 100, including updates concerning local conditions of the flight corridors in the area of operation. The updates may be received from the global services 103, from the distribution centers 101, or from other UAVs 102. In some embodiments, updates may also be received from the service requestors 104, or from third-parties, such as weather information providers, news services, air traffic controllers, satellites, civil aviation authorities, law enforcement, military aviation authorities, etc.

The mission planner 200 may modify the dynamic route during the mission as the flight corridor updates are received. For example, in some embodiments, the mission planner 200 may alter the dynamic route to avoid flight hazards such as inclement weather, aircraft trespassing into a flight corridor, etc. When the route is modified, the mission planner 200 will re-determine the sequence of flight corridors that will be traversed to reach the goal location.

Figure 2B:
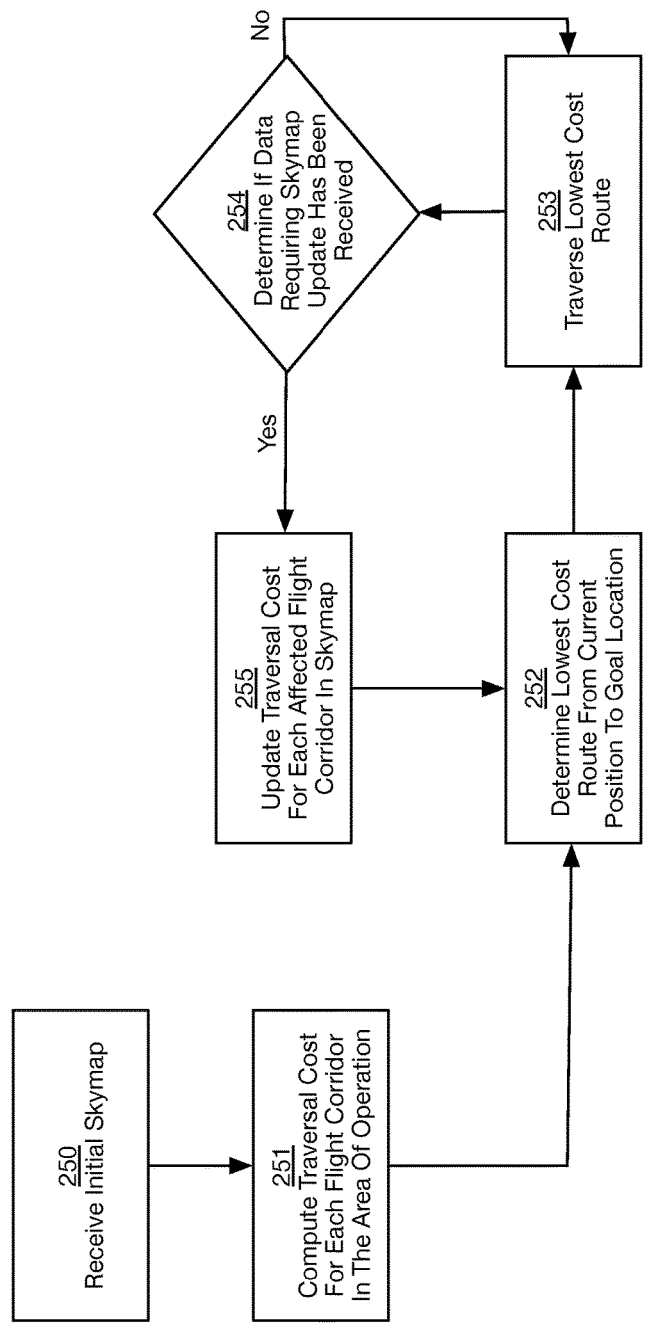
FIG. 2B is a diagram illustrating a process for rerouting a flight, according to one example embodiment.

FIG. 2B illustrates one embodiment of the mission planner 200's dynamic routing process for a goal location. In the illustrated process the UAV 102 first receives 250 an initial local skymap. The skymap may be received prior to launch or after launch. In one embodiment, a skymap is received from the global services 103 directly. In another embodiment, a skymap is received from the distribution center 101.

In one embodiment, the skymap that is provided to the UAV 102 is a global skymap that contains data about the entire area that the UAS 100 covers. In another embodiment, the skymap contains information about only the area of operation for the UAV 102's current mission.

Once the skymap is received 250 the mission planner 200 computes 251 a traversal cost for each flight corridor in the area of operation. The traversal cost for a flight corridor is a measure of the suitability of the corridor's path for a flight to the goal location. The goal location may be any point that the UAV 102 must traverse to complete its mission. For example, the destination site 105 may be the goal location on the outward leg of the UAV 102's mission, while the distribution center 101 may be the goal location on the return leg of the UAV 102's mission. The traversal cost of a flight corridor may take into account many factors, including but not limited to, the wind speed and weather in the flight corridor, the air traffic within the flight corridor, the length and elevation of the flight corridor, and the number and direction of maneuvers required to navigate the flight corridor. The traversal cost for a flight corridor may take into account the predicted energy consumption necessary to fly the UAV 102 along the flight corridor's path. Flight corridors that are predicted to require greater energy to traverse may be assigned a greater traversal cost than flight corridors that require less energy. For example, a flight corridor that has a tailwind may have a lower traversal cost than a flight corridor with a headwind. The traversal cost may also take into account regulatory limits to flight paths. For example, if a flight corridor intersects an area that has been temporarily designated as a no-fly zone by the local aviation authority, the traversal cost for that flight corridor may be set to infinity until the no-fly restriction is lifted.

In some embodiments, the traversal cost for flight corridors is pre-computed by the global services 103 or the distribution center 101, and is included in the skymap received 250 by the UAV 102.

After the traversal cost for each flight corridor in the skymap is computed 251 the mission planner 200 determines 252 a lowest cost route from the UAV 102's current position to the goal location, using the flight corridors. Any appropriate path-finding and/or graph traversal algorithms can be used to find the lowest cost route, including the A* algorithm, Dijkstra's algorithm, and other similar algorithms known to those with skill in the art.

Once the lowest cost route is determined 252, the UAV 102 will traverse 253 the lowest cost route. As the UAV 102 flies to the goal location, it may periodically receive information from the global services 103, the distribution centers 101, other UAVs 102, and third party information sources (such as weather services, aviation authorities, etc.). Any of the data received from such sources may constitute a local skymap update, in the sense that the traversal cost of one or more flight corridors in the area of operations may need to be changed. For example, if the weather in a particular region changes, the traversal cost of flight corridors in that region may increase or decrease depending on the wind in those flight corridors and the direction that the UAV 102 must fly.

The mission planner 200 may determine 254 whether a given piece of data received by the UAV 102 constitutes a local skymap update by applying rules and heuristics to the received information. For example, in some embodiments, if the mission planner 200 receives information that pertains to regions outside the area of operations, it may determine that this information does not constitute a local skymap update.

Some information that the UAV 102 receives may be filtered out from consideration because it is not related to factors that may affect the flight of an aircraft. For example, if the UAV 102 receives information regarding inventory levels at a distribution center 101, this information may be stored or forwarded, but it will not influence the local skymap, since inventory levels will not influence the traversal cost of flight corridors. (Note, however, that changing inventory levels may influence the mission planner 200's selection of a goal destination. For example, after a service request has been fulfilled, a UAV 102 may be routed to land at a distribution center 101 where there are insufficient UAVs in the inventory for future missions, as opposed to the distribution center that it took off from.)

As long as the mission planner 200 determines 254 that no data requiring an update to the local skymap has been received, the UAV 102 continues to fly on the lowest cost route that has already been determined 252. However, if a local skymap update has been received, then the mission planner 200 will update 255 the traversal cost for each affected flight corridor in the local skymap.

The mission planner 200 will then re-determine 252 the lowest cost route to the goal location based on the updated traversal costs of the flight corridors in the local skymap.

As illustrated in FIG. 2A, the UAV 102 also includes a flight controller 201. The flight controller 201 provides the mission planner 200 with guidance, navigation, and control functions. For example, the mission planner 200 is required to know the location, orientation, altitude, and speed of the UAV 102 at various times during the mission, and the flight controller 201 provides this information through a process called state estimation. Similarly, when the mission planner 200 requires the UAV 102 to move from one point to another, it sends commands to the flight controller 201 to achieve that goal. The flight controller 201 communicates over the bus with the sensor system 202, the actuator control system 204, and the propulsion management system 205, to provide the guidance, navigation, and control functions.

The sensor system 202 provides information from sensor instruments to the flight controller 201. In some embodiments, the sensor system 202 comprises several instruments, such as, for example, a GPS unit, an Inertial Measurement Unit (IMU), dynamic pressure sensor, static pressure sensor, air temperature reader, etc.

The actuator control system 204 includes motorized actuators (or actuators that are moved by any other means, such as hydraulics) that control various moving parts on the UAV 102, including the control surfaces on the airframe. The actuator control system 204 can change the state of the motorized actuators based on commands from the flight controller 201. The actuator control system 204 can also report the current state of the motorized actuators back to the flight controller 201.

The propulsion management system 205 controls the force exerted by the motors mounted on the UAV 102—for example by adjusting the speed of propellers mounted on a propeller powered UAV—and monitors the amount of battery capacity remaining on the UAV. The flight controller 201 can adjust the speed of travel of the UAV 102 by communicating with the propulsion management system 205. The propulsion management system 205 may also monitor the physical attributes of batteries onboard the UAV 102, such as changes in a battery's voltage over time, changes in the current output by a battery over time, changes in a battery's cell chemistry over the duration of a flight, etc. The monitored information may be communicated to the distribution center 101 or global services 103, either during the mission via the communications system 203, or after the UAV 102 has returned to a distribution center 101. In the latter case the information may be communicated by wireless means, wired means, or by physical transfer of some storage medium such as a memory card.

The flight controller 201 receives information from the sensor management system 202 and the actuator control system 204, and performs a state estimation that provides a best guess of the UAV 102's position, orientation, and speed to the mission planner 200. The state estimation is continuously updated and checked as the various systems of the UAV 102 provide new information.

The mission planner 200 determines the high-level goal location that the UAV 102 must travel to and communicates the goal location to the flight controller 201. The mission planner 200 may communicate directives and goals to the flight controller 201 using any appropriate technique(s). For example, in one embodiment, the mission planner 200 communicates movement goals to the flight controller 201 via a sequence of waypoints. In another alternative embodiment, the mission planner 200 communicates movement goals to the flight controller 201 via splines.

The flight controller 201 receives the movement goals—as waypoints, splines, or any other suitable form—and determines, based on rules or physics-based models, the commands that must be communicated to the actuator control system 204 and the propulsion management system 205 to achieve the movement goals. For example, according to some embodiments, the physics-based models output the required rudder and elevator state, and the motor thrust for the UAV 102, based on the current state estimation (i.e. the UAV 102's position, orientation, and speed), and the local conditions including wind and temperature.

The communication system 203 comprises transmitters and receivers that enable the UAV 102 to send and receive information using different communications protocols. The communication system 203 may include transmitters and receivers for standard cellular radio technologies such as CDMA, GSM, 3G/4G, LTE, etc., as well as custom line-of-sight and mesh protocols that allow the UAV 102 to directly communicate with a distribution center 101 or another UAV 102.

Although the UAV 102 is designed to operate autonomously, the mission planner 200 is configured to receive instructions via the communications system 203 that may override the mission planner 200's flight plans. For example, the UAV 102 may receive instructions from a distribution center 101 or the global services 103 that command the UAV 102 to return to base immediately due to bad weather or a passenger aircraft entering the area. On receiving such a command the mission planner 200 will change the movement goals of the UAV 102 and issue new directives to the other modules, so that the UAV 102 adjusts its flight path as necessary.

Since there are potentially many external parties that could issue commands to the UAV 102, and since the communications links between the UAV 102 and the parties issuing commands may not be reliable, a mechanism may be helpful to ensure that the UAV 102 does not execute contradictory or stale commands. In one embodiment, the finite state machine 208 is used by the mission planner 200 to determine the validity and precedence of commands received from external sources, and to determine the directives and goals that should be sent to the other modules of the UAV 102.

The payload management system 206 performs various functions related to the payload carried by the UAV 102, depending on the nature of the service request and the payload. For example, when the payload is attached to the UAV 102 prior to launch, the payload management system 206, will communicate that the attachment is successful to the mission planner 200 and/or the distribution center 101. In the case where the service request is a package delivery, the payload management system 206 also monitors the state of the payload—for example the temperature of the payload in the case where the payload is perishable—and manages the release of the payload at the destination site 105. In this example, the mission planner 200 determines the location, altitude, speed, and orientation of the UAV 102 required to drop the payload safely at the destination site 105, and communicates a command to release the payload at the appropriate time to the payload management system 206. The payload management system 206 receives the command and releases the payload.

The payload management system 206 may perform other functions depending on the nature of the payload. For example, in the case where the service request is related to surveillance or mapping, the payload management system 206 may interface with a camera system included in the payload and can capture images or video based on instructions received from the mission planner 200. For instance, in this embodiment, the mission planner 200 may issue a command to the payload management system 206 to capture images when the UAV 102 flies over some point of interest in its route.

The safety system 207 manages various failsafe components mounted on the UAV 102. For example, in one embodiment, the safety system 207 monitors and controls a parachute system that may be deployed based on a command received from the mission planner 200, or based on information received directly from the flight controller 201 or sensor system 202. For instance, if the UAV 102 enters a non-recoverable dive, the safety system 207 may deploy the parachute based on data received from the sensor system 202. In another embodiment, the mission planner 200 may instruct the safety system 207 to deploy a parachute based on a message received from the global services 103 or a distribution center 101. Parachute deployment on command may be useful in situations where an air traffic control process detects the possibility of imminent collision between multiple aircraft in an area with heavy air traffic. Forcing a UAV 102 to deploy its parachute and descend may prevent it from entering the flight path of other aircraft.

The structure and functionality of the UAV 102 described above has been divided into modules based on one example implementation, but the functionality of various modules may be merged or further split such that there are more or less components than have been illustrated in FIG. 2A. It is also possible to devolve some of the functionality of the various modules directly into the actuators, sensors, and other hardware components of the UAV 102. For instance, the flight controller 201 may communicate directly with a plurality of actuator motors, each of which has the functionality of the described actuator control system 204. Such a decentralization of hardware component control may be beneficial in some implementations from the point of view of fault-tolerance.

Distribution Center

The distribution center 101 handles the local logistics for the UAS 100. When the global services 103 receive a service request from a service requestor 104, the global services 103 will select a distribution center 101 to fulfill the service request according to criteria in the service request, including the location of the destination site 105. The global services 103 will then send at least a portion of the information in the service request to the selected distribution center 101.

The distribution center 101 is responsible for launching and recovering UAVs 102, maintaining and monitoring inventories of payloads, equipment, batteries, and UAVs 102, and communicating local information to the global services 103. Other functions such as UAV, battery, and payload selection for missions, mission data preparation, UAV monitoring and communication during the mission, and other tasks can be performed by either the distribution centers 101 or the global services 103, depending on implementation and/or system status. A distribution center operator 107 may be stationed at the distribution center 101 to facilitate the distribution center operations.

Figure 3A:
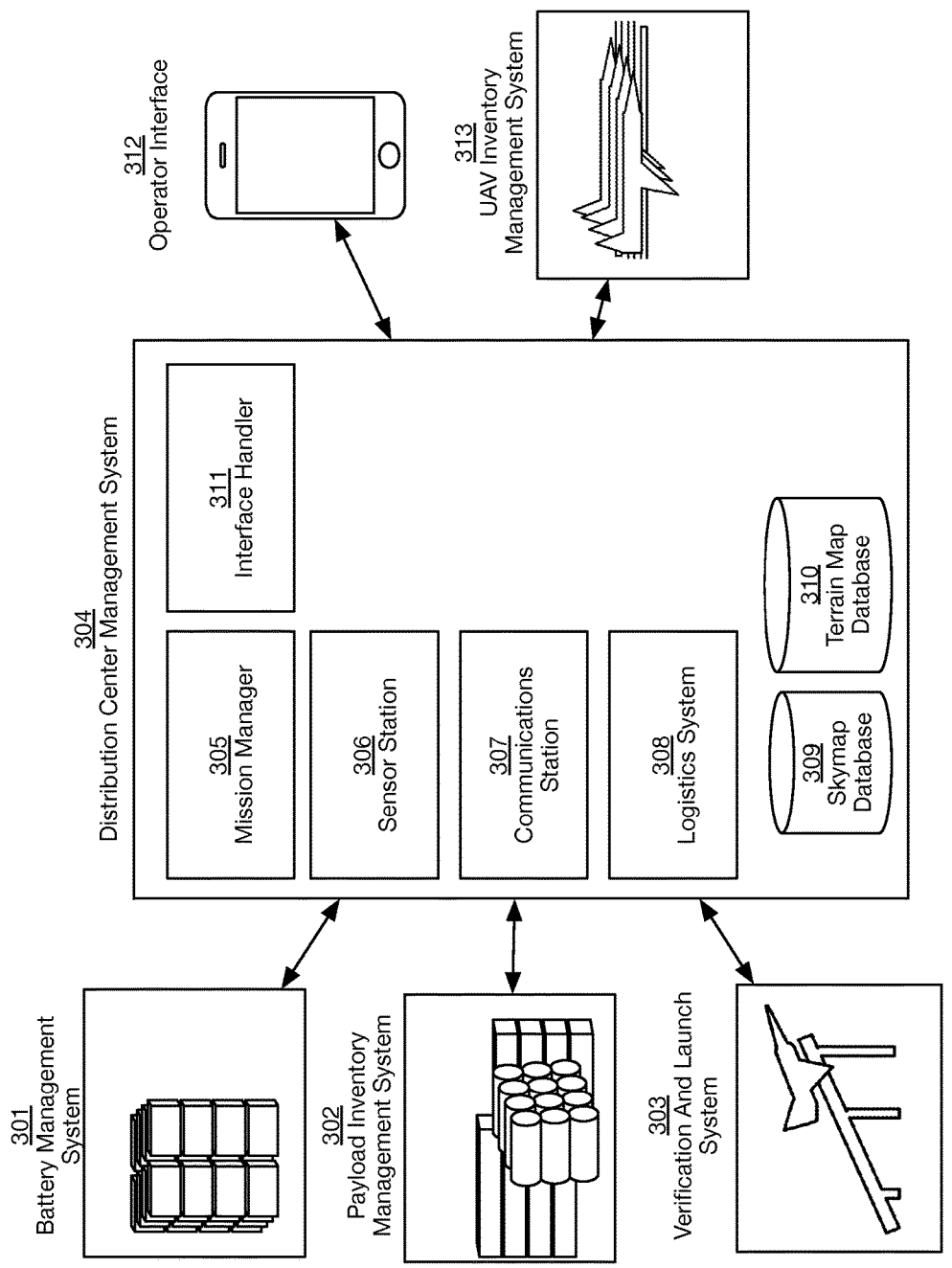
FIG. 3A is a diagram illustrating components of a distribution center, according to one example embodiment.

FIG. 3A is a block diagram of a distribution center 101, according to one example embodiment. As mentioned previously, some of the functions performed by this embodiment of the distribution center 101 could be performed by the global services 103 instead. Similarly, some of the functions of the global services 103 could be performed locally by the distribution center 101. System designers with skill in the art may divide the functionality of the global services 103 and the distribution centers 101 in any appropriate way based on the requirements of a particular UAS implementation.

In this embodiment, the distribution center 101 comprises a battery management system 301, a payload inventory management system 302, a verification and launch system 303, a distribution center management system 304, an operator interface 312, and a UAV inventory management system 313.

The distribution center management system 304 serves as the hub of the distribution center 101. In this embodiment, the distribution center management system 304 comprises a mission manager 305, sensor station 306, communications station 307, logistics system 308, skymap database 309, terrain map database 310, and interface handler 311. In one example embodiment, the distribution center management system 304 is implemented using one or more computer servers that have specialized sensor and communications peripherals installed.

Some of the functions of the distribution center 101 may require the assistance of a human distribution center operator 107. For example, UAV assembly, UAV repair, payload attachment and detachment, UAV recovery, battery replacement, placing UAVs 102 on the verification and launch system 303, and placing batteries into charging equipment are tasks that may require human involvement if they are not fully automated. The operator interface 312 allows the distribution center operator 107 to receive information and instructions from the distribution center management system 304 and the global services 103, as well as to send information and instructions back to the distribution center management system 304 and the global services 103. The distribution center management system 304 communicates with the operator interface 312 via the interface handler 311. In some embodiments, the operator interface 312 is an application running on a smartphone, a tablet computer, or a personal computer, and the interface handler 311 communicates with the application via a wireless communications protocol, such as IEEE 802.11.

The mission manager 305 is a module that is responsible for managing the local aspects of mission operations at the distribution center 101. In some embodiments, the mission manager 305 receives service requests (or data derived from the service requests) from the global services 103, selects a UAV 102 or UAV components that will be assembled into a UAV 102, prepares the mission data that will be utilized by the UAV 102 during the mission, selects an appropriate payload for the mission, tests and launches the UAV 102, and monitors the status of the UAV 102 and payload during the mission. The mission manager 305 communicates with the distribution center operator 107 via the operator interface 312 during various stages of the mission to communicate both the status of the mission, as well as instructions indicating the actions to be taken to facilitate the preparation, loading, launch, and recovery of UAVs 102.

The mission manager 305 utilizes the other components of the distribution center management system 304 to monitor the status of the local environment and various local components of the UAS 100, including the UAVs 102, verification and launch system 303, battery management system 301, and the local inventories.

The mission manager 305 maintains contact with the global services 103 and local UAVs 102 through the communications station 307. Information about service requests is received from the global services 103, and information about local conditions, ongoing missions, inventories, etc., is transmitted back to the global services 103. The communications station 307 may have transmitters and receivers for several different standard telecommunications protocols, including, but not limited to GSM, CDMA, GSM, 3G/4G, LTE, etc. In addition to these standard protocols, the communications station 307 may also support line-of-sight or mesh protocols to enable direct communications with UAVs 102 and other distribution centers 101. Finally, the communications station 307 may also include a wired connection to the Internet for high-speed communication with the other components of the UAS 100 and third-party information providers. The mission manager 305 may send some of the information received via the communications station 307 to the operator interface 312, so that the distribution center operator 107 can monitor the status of UAVs 102 or other components of the UAS 100 that are relevant to a local mission.

The sensor station 306 is primarily used to gather local weather data for the distribution center 101's location. The sensor station 306 may include pressure sensors, thermometers, wind sensors, precipitation detectors, etc. The sensor station 306 may also be used to detect and track UAVs 102 using instruments such as radars, radio trackers, and optical object recognition systems. The mission manager 305 may present information from the sensor station 306 to the distribution center operator 107 via the operator interface 312, so that the distribution center operator 107 can take actions necessary to protect the UAVs 102 and distribution center 101 from inclement weather. For example, if the sensor station 306 detects an approaching storm, the mission manager 305 may display a notification to the distribution center operator 107 via the operator interface 312, and the operator 107 can follow procedures to recover UAVs 102 that have already been launched, to abort missions that have not been launched, and the like.

Prior to any vehicle mission being launched, the mission manager 305 determines the mission energy requirement for the mission based on mission information. Mission information may include information from the service request, information about the local conditions (such as temperature, wind, and precipitation), and information about the characteristics of the vehicle and payload. For example, in one embodiment, the energy requirement is determined by computer analysis of factors such as the location of the destination site 105, the route to the destination site 105, the wind conditions along the route to the destination site 105, the flight characteristics of the UAV 102 that will handle the mission (such as its typical power consumption per unit distance flown, aerodynamic drag, etc.), and the weight of the payload that is needed to fulfill the service request. The mission manager 305 communicates the mission energy requirement to the battery management system 301, which then selects one or more batteries that can provide sufficient power for the mission from the battery inventory. The battery management system 301 may automatically install the selected batteries into the UAV 102 that will fly the mission, or it may use indicators to notify the distribution center operator 107 of a particular battery to be installed into the UAV 102. Further details related to the operation of the battery management system 301 are discussed below.

The logistics system 308 tracks the inventory levels of various components at the distribution center 101, and reports these inventory levels to the global services 103 and the mission manager 305. This inventory information may be used when selecting a particular distribution center 101 to fulfill a service request.

The logistics system 308 interfaces with the battery management system 301, the payload inventory management system 302, and the UAV inventory management system 313 to determine the inventory levels of batteries, payloads, and UAVs/UAV components, respectively. The logistics system 308 is capable of requesting deliveries of additional stock when inventory levels fall below a threshold level or when inventory levels are predicted to fall below a threshold level within a specified period of time.

The global services 103 may monitor the inventory levels reported by the logistics system 308 and may proactively dispatch additional inventory items to a distribution center 101 based on current inventory levels or the predicted inventory levels in the future. The logistics system 308 may also directly notify the distribution center operator 107 of inventory shortages, or of errors with specific items in an inventory, via the operator interface 312. Based on these notifications, the distribution center operator 107 may restock or repair items as needed.

Each item at the distribution center 101 may be affixed with a tracking tag that can be monitored by the logistics system 308. Various technologies can be used to implement the tracking tags, including bar codes, RFID tags, NFC tags, etc. These tags may be affixed to every item at the distribution center 101 that requires tracking, including UAVs 102, UAV components, payloads, batteries, spare parts, etc. The tags associate an object identifier with each tracked physical object at the distribution center 101. For example, each payload at the distribution center 101 will have an object identifier associated with it that is indicated by the tag affixed to it. The object identifier may be read from the tag by way of a reader that is configured to scan the tag. For example, an RFID tag would be read using an RFID reader, an NFC tag using an NFC reader, etc.

The object identifiers can be used to determine the type of an object that has been scanned as well as its unique identity. For example, the tag affixed to a payload object will identify that the object is a payload of a specific type, as well as that it is a specific instance of that payload, different from other payloads of the same type in the inventory. In some embodiments, the object identifier can be used to determine a database entry associated with the object in an inventory database. The logistics system 308 reports the inventory levels for objects associated with each object identifier to the global services 103.

The illustrated embodiment of a distribution center 101 also includes a payload inventory management system 302 that tracks inventory levels and status for various payloads that may be mounted to the UAVs 102. The payload inventory management system 302 may also provide recharging, refrigeration, and other maintenance related functions related to specific payloads. For instance, if the payload is a vaccine, then the payload inventory management system may provide a refrigerated storage container for vaccine doses and may monitor and report the temperature in the storage container and the number of doses stored in the container to the logistics system 308. The mission manager 305 may notify the distribution center operator 107 of the status of various payloads stored at the distribution center 101 via the operator interface 312. For example, in some embodiments, the mission manager 305 may send a notification to the operator interface 312 to notify the distribution center operator 107 that a particular vaccine stored in the payload inventory management system 302 has expired. Based on this notification the distribution center operator 107 may remove the expired vaccine from storage and replace it with new stock.

The UAV inventory management system 313 tracks the assembled UAVs 102 and UAV components stored at the distribution center 101, and reports this information to the logistics system 308. The mission manager 305 or global services 103 may query the logistics system 308 to determine the UAV resources available for missions at a particular distribution center 101, and may allocate these resources based on the requirements of service requests received by the UAS 100. When a particular UAV configuration is required to fulfill a mission, the mission manager 305 may send instructions to the distribution center operator 107, via the operator interface 312, to assemble a particular set of UAV components—stored in the UAV inventory management system 313—to construct a UAV suitable to complete that mission. As UAVs or UAV components are added and removed from the inventory, the UAV inventory management system 313 tracks not only the availability of these resources, but also the status of components, such as their condition and need for replacement. This information may be used by the mission manager 305 and the global services 103 to order deliveries of new UAVs 102 or components for the distribution center 101.

The mission data that will be uploaded to the UAV 102 is prepared based on the requirements of the service request received from the global services 103. Although we discuss the preparation of the mission data by the mission manager 305, alternative embodiments are possible, where either the global services 103 or the mission planner 200 onboard the UAV 102, prepare the mission data. The mission data includes not only the location of the destination site 105 and the payload required to satisfy the service request, but also information required to generate a flight route to the destination location. The information required for route generation is stored locally in the skymap database 309 and the terrain map database 310.

The skymap database 309 contains data about a plurality of flight corridors in the geographic region served by the distribution center 101. The skymap database 309 may be at least partially synchronized with a global skymap database 400 that is part of the global services 103. The flight corridor data includes information about the real-time conditions within the flight corridors, such as weather, air traffic, etc. The local skymap database 309 updates the flight corridor data based on the latest information received from the global services 103, other distribution centers 101, and third parties (such as weather services and air traffic controllers). UAVs 102 that have recently flown in a flight corridor may also send data to the distribution center 101 about the last monitored conditions present in the flight corridor, and this information may be used by the skymap database 309 to update the relevant flight corridor data. When the local skymap database 309 at the distribution center 101 has more recent information about a flight corridor than the global skymap database 400, the global skymap database 400 is updated via the communications station 307. The reverse is also true, and the latest updates from the global skymap database 400 are received via the communications station 307 and incorporated into the local skymap database 309.

The terrain map database 310 contains terrain data, which is information about the terrain and ground obstacles in the geographic region served by the distribution center 101. This terrain data can be stored in a number of ways, including but not limited to, as raw images, as a heightmap, and as a three-dimensional (3D) mesh. The global services 103 also include a global terrain map database 401, which is at least partially synchronized with the local terrain map database 310. As in the case with the skymap databases, the terrain map database 310 is updated based on data captured from UAVs 102 during their mission flights. For example, if a UAV 102 flies over a location and captures information regarding a new obstacle that was not present at that location in the terrain map database 310, the terrain map database 310 will be updated with the new information via data received from the UAV 102, either during the mission, or after the UAV 102 has been returned to the distribution center 101.

Although the information about the flight corridors from the skymap database 309 may be sufficient to route the UAV 102 to the destination site 105, information about the ground that the UAV 102 is flying over can also be useful during various phases of the mission. For instance, during UAV launch and recovery, the terrain and obstacles near the launch and recovery sites are relevant. In addition, if the service request requires a package delivery, then the terrain and obstacles at the destination site 105 are relevant, as the UAV 102's mission planner 200 must determine a location from which to drop the payload such that the payload lands in an accessible place and does not damage local structures, objects, or persons.

The information from the terrain map database 310 is also useful for fulfilling service requests that require surveillance or mapping. In some instances, the terrain data from the terrain map database 310 can be used to fulfill a surveillance or mapping request without launching a UAV. For example, if a UAV 102 has recently captured imagery at a destination site 105 at a particular location, and a subsequent service request asks for image capture at the same location, within some threshold time limit, then the most recent information from the destination site 105 that has been stored in the terrain map database 310 can be sent to the service requestor 104.

To prepare the mission data locally, the mission manager 305 first determines the location of the destination site 105 from the service request information received from the global services 103. Based on this destination location, and the launch location, which is typically the location of the distribution center 101, the mission manager 305 determines the relevant area of operations for the mission, and extracts the data associated with this geographic region from the skymap database 309 and the terrain map database 310. The extracted information is sent to the UAV 102 as part of the mission data. In some embodiments, the mission manager 305 also provides the UAV 102 with a lowest cost route to the destination site 105 as part of the mission data. Depending on the implementation, the route can be dynamically updated by the global services 103, the mission planner 200 in the UAV 102, and/or the mission manager 305. When the connectivity to the UAV 102 cannot be guaranteed during the mission flight, the mission planner 200 onboard the UAV 102 may be allowed to dynamically update the route. The process for dynamic route generation is explained in more detail in the description for FIG. 2B. In embodiments discussed in connection with FIG. 2B, the UAV 102 receives the skymap data and determines the lowest cost route to the destination site 105 using the onboard mission planner 200, instead of receiving the route from the mission manager 305.

In some embodiments, the UAV 102 stores complete mirrors of the skymap database 309 and the terrain map database 310, instead of only subsets of the information in these databases. This can be done when the size of the databases is small enough that the storage resources on the UAV 102 are sufficient to store the entire dataset. When this is not the case, a subset of the information may be stored in the UAV 102, as described earlier. Similarly, in the case where the local skymap database 309 and local terrain map database 310 have sufficient storage capacity, the entire global skymap 400 and global terrain map 401 may be stored locally at the distribution center 101. Subsets of the global data may be extracted and stored locally only when the global data sets are too large for complete local mirroring to be economical.

The verification and launch system 303 is responsible for testing, verification, and launching of UAVs 102. The UAVs 102 are loaded into the verification and launch system 303, and their components are tested to ensure that they will perform during the mission. Any faulty components are identified at this stage and brought to the attention of the distribution center operator 107 via the operator interface 312. The verification and launch system 303 also verifies, via the affixed tags, that each component in the assembled UAV 102 is a component allocated by the mission manager 305 for the current mission. For example, the verification and launch system 303 detects the battery and motors attached to the UAV 102, and ensures that they have adequate charge and performance for the mission, prior to launch. Any discrepancies are brought to the attention of the distribution center operator 107 for correction. Similarly, the verification and launch system 303 verifies that the payload loaded onto the UAV 102 is the right payload for the current mission.

The verification and launch system 303 is designed to allow the distribution center operator 107 to launch multiple aircraft, in high-volume, reliably and repeatedly, within a short period of time. More details regarding the verification and launch system 303 are provided in connection with the description for FIGS. 5A through 5K.

Once the verification and launch system 303 verifies the UAV 102, the UAV 102 is launched, and the mission manager 305 continues to monitor the aircraft during the mission flight. The mission manager 305 receives status updates from the UAV 102, and these status updates enable the mission manager 305 to track the progress of the mission at least intermittently. The mission manager 305 may present information related to the UAV 102's status to the distribution center operator 107 via the operator interface 312. In the event that there is some local event that requires a mission termination, such as, for example, an approaching storm, either the mission manager 305 or the distribution center operator 107 (or both), via the operator interface 312, can send a command to the UAV 102, through the communications station 307, to instruct the UAV 102 to return to the distribution center 101.

Battery Management System

Battery related components of the UAS, such as battery chargers, battery monitoring equipment, and the batteries themselves, are managed by the battery management system 301. Apart from charging and monitoring batteries, the battery management system 301 selects batteries for installation in UAVs 102 based on mission energy requirements communicated by the mission manager 305.

Figure 3B:
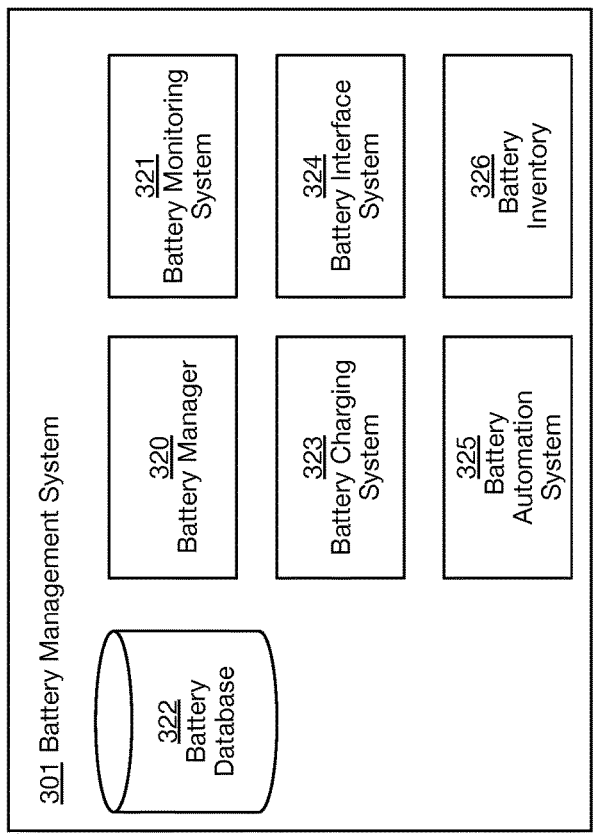
FIG. 3B is a diagram illustrating components of a battery management system, according to one example embodiment.

FIG. 3B illustrates the components of a battery management system 301 according to one example embodiment. In this embodiment, the battery management system 301 comprises a battery manager 320, a battery monitoring system 321, a battery database 322, a battery charging system 323, a battery interface system 324, a battery automation system 325, and a battery inventory 326.

The battery inventory 326 comprises a number of batteries that can be used to power electric vehicles. This disclosure has primarily discussed electric UAVs 102, however the batteries could be used to power other electric vehicles, such as, for example, electric cars, electric scooters, industrial equipment, robots, etc. The batteries in the battery inventory 326 may be coupled to or include battery sensors that facilitate monitoring of the batteries by the battery monitoring system 321. The battery sensors may be part of the batteries themselves, or they may be separate instruments that are part of the battery monitoring system 321 that can be attached to and detached from the batteries.

The battery monitoring system 321 uses the battery sensors to detect properties of each battery in the battery inventory 326. Detecting properties of a battery may include sensing, calculating, estimating, or otherwise determining values, properties, or other characteristics of a battery. The detected properties may be reported as, or may be used to generate, battery information for each battery. Battery information may include the voltage and output current at the battery's electrodes, the amount of electrical energy stored in the battery (sometimes referred to herein as "charge level"), the storage capacity of the battery (sometimes referred to herein as "capacity" or "storage capacity"), the temperature of the battery, the number of charge and discharge cycles the battery has undergone, and the rate of change in voltage and output current when the battery is charged or discharged. As used herein, both the amount of electrical energy stored in a battery and the storage capacity of the battery may be measured with the same unit (e.g., Watt-hours or Amp-hours). However, for a given battery, the values of these properties may be different. For example, a battery with a capacity of 100 Watt-hours may be charged to 50% of its capacity, and thus have a charge level of 50 Watt-hours.

The battery information may also include data about the chemical and physical state of the battery's electrodes and electrolytes. The battery monitoring system 321 may send the battery information to the battery manager 320, as well as to other modules of the distribution center 101 and the global services 103.

The battery information can be used to determine many aspects of a battery's condition. For example, the battery information can be used to determine the energy storage capacity for each battery, the useful remaining operational life for each battery, the charge level of each battery, the predicted capacity degradation for each battery (e.g., the reduction in the energy storage capacity of the battery as compared to an ideal or a previously measured energy storage capacity), the likelihood of failure of each battery, etc. These determinations can be made by the battery manager 320, or by other modules in the distribution center like the mission manager 305, or remotely by modules in the global services 103.

At least some of the battery information, which the battery monitoring system 321 gathers from the batteries, may be stored into a battery database 322. The battery database 322 is a device that provides means for storing information durably. In one embodiment, the battery database 322 may be a computer with a hard drive or a solid state drive (or some other means for storage) running a software database system such as MYSQL, POSTGRES SQL, MONGODB, etc. In another embodiment the battery database 322 is a software program running on a cloud service, such as AMAZON WEB SERVICES, GOOGLE CLOUD, etc. In another embodiment the battery database 322 is part of the battery manager 320, or executes on the same computer hardware as the battery manager 320. The battery database 322 may also be implemented as a module of the global services 103, in which case the battery information from the battery monitoring system 321 will be transmitted in real-time or periodically, via the Internet, or another means, to the global services 103.

The battery charging system 323 may comprise a single charging device that can be coupled to one or more batteries in the battery inventory 326, or it may comprise several independent devices that can charge many batteries. In one embodiment, the battery charging system 323 comprises a rack charger that can be coupled to many batteries simultaneously. The battery charging system 323 receives instructions from the battery manager 320 identifying target charge specifications for batteries (either individually or collectively), and charges the batteries to achieve the target charge specifications.

The battery monitoring system 321 may report one or more properties or characteristics of the batteries to the battery manager 320 during charging to enable the battery manager 320 to issue charging instructions to the battery charging system 323 to stop charging, increase or decrease the rate of charging, change the target charge specifications for the batteries, or the like. The battery manager 320 may issue charging instructions in several different ways. In one embodiment the charge specification includes a target output voltage for each battery, and the battery charging system 323 will apply current to the battery at a particular input voltage until the batteries show the target output voltage at their electrodes. In another embodiment the charge specification includes both a target output voltage and a target output current. In this embodiment the batteries are charged until they reach the target output voltage and the target output current, and then the charging is stopped. In another embodiment the charge specification includes a target power rating (e.g. a target Watt-hour) or target current rating (e.g., Amp-hour), and the batteries are charged until the target power or current rating is reached. In another embodiment, the charge specification includes a target reading from a charge sensor of the battery. The charge sensor is a sensor (and/or associated circuitry or other components) that is incorporated into the battery and which is indicates a level of charge of the battery (e.g., Watt-hours, Amp-hours, etc.). The battery charging system 323 may read an output from the charge sensor via any appropriate technique, such as visual analysis of a display, detection of an analog signal that represents or indicates the charge level of the battery, or receiving a digital signal that includes a charge level of the battery.

In one embodiment, the battery charging system 323 receives a charge specification for one or more selected batteries and charges the batteries based on the charge specification. The charge specification may instruct the battery charging system 323 to charge a battery less than its full energy storage capacity in order to minimize the capacity degradation of the battery as a result of unnecessary charging.

In one embodiment, the battery charging system 323 has a safety mechanism that automatically halts the electricity flow into a battery if it detects that the battery temperature, voltage, or current is outside of a safety range for these properties, or if the charge specification would exceed the storage capacity of the battery.

The battery manager 320 is a hardware or software module that coordinates the functioning of the other components of the battery management system 301. In one embodiment, the battery manager 320 is a software program running on hardware that has network access to the other components of the battery management system 301. In another embodiment, the battery manager 320 is a software program that executes on the same computer hardware as one or more other components of the distribution center 101. In one embodiment the mission manager 305 and the battery manager 320 are merged into a single module that executes on the same computer hardware.

The battery manager 320 receives battery information from the battery monitoring system 321 and the battery database 322, as well as requests from the mission manager 305, and determines specific instructions for the other components of the battery management system 301, as well as for the distribution center operator 107. For example, the battery information received from the battery monitoring system 321 may include information indicating that the charge in a specific battery is insufficient for a particular UAV mission, and on the basis of this information the battery manager 320 may send instructions to the battery charging system 323 to charge that specific battery. If the specific battery is not already coupled to the battery charging system 323, the battery manager 320 may also send instructions to a battery automation system 325 or to the distribution center operator 107 to connect the specific battery to the battery charging system 323.

The battery manager 320 may receive mission energy requirements, describing an amount of energy required by an electric vehicle (e.g., a UAV) to complete a mission, and the battery manager 320 may issue instructions (e.g., battery selection instructions, charge specifications, etc.) on the basis of the mission energy requirements. The mission energy requirements may be received locally from the mission manager 305 or an electric vehicle, or remotely from a module in the global services 103.

The mission energy requirements may specify a charge level needed by an electric vehicle to complete a mission. For example, a mission energy requirement may specify the energy required by a UAV 102 to fly to a destination site 105 along a particular route with a given wind condition, drop a payload, and return to a distribution center 101. The mission energy requirement may be specified in a standard unit such as Watt-hours, Amp-hours, or by some other metric.

The mission energy requirement may specify a power requirement in addition to a charge level. In particular, whereas the charge level relates to a total amount of electrical energy that the battery can deliver from a given charge, a power requirement may define a particular amount of power that may be required by the electric vehicle for part of its mission. For example, if the UAV 102 must fly over a windy mountain, it may need an increased amount of power delivered to its motors during its ascent as compared to the power requirement during level flight. Thus, any battery selected for such a mission will need to be able to provide the boost of power needed for the ascent, in addition to providing the overall amount of energy required for the rest of the mission. By taking the power requirement of a mission into account in addition to overall energy requirements, the selection and charging of batteries can be tailored to individual missions. For example, a longer mission with lower maximum power requirements (e.g., characterized by level flight with low winds) may be able to use a battery with a larger capacity but a lower maximum power output, whereas a shorter mission with higher maximum power requirements (e.g., characterized by frequent altitude changes and/or windy conditions) may be able to use a battery with a lower capacity (or a battery that is charged to a lower charge level) but a higher maximum power output. In the foregoing discussion, the power requirement may be replaced and/or supplemented with an electrical current requirement. Thus, a battery may be selected for its ability to deliver a certain maximum electrical current to the motors of the UAV 102.

In an alternative embodiment, instead of directly receiving a mission energy requirement, the battery manager 320 may determine the mission energy requirement based on mission information received from the mission manager 305, an electric vehicle, or from the global services 103. The mission information may include information such as the location of the destination site, characteristics of the electric vehicle, local weather conditions, and/or route information.

In one embodiment, the battery manager 320 instructs the battery charging system 323 to charge a battery based on the mission energy requirements and the existing charge in the battery. For example, the battery manager 320 may instruct the battery charging system 323 to charge a specific battery only partially, for a specific UAV 102, if that UAV 102 has only a small mission energy requirement (perhaps due to it having to make only a short flight for its mission, or because it has a favorable tail wind for its mission).

In one embodiment the battery manager 320 uses the battery information and the mission energy requirements to select one or more batteries that can efficiently provide the energy required by an electric vehicle for a particular mission, while at the same time balancing other concerns, such as minimization of battery degradation, maximization of battery life, etc.

The battery manager 320 selects a battery or batteries for a particular electric vehicle's mission based on several possible criteria and methodologies. In one embodiment, the battery manager 320 selects batteries by determining a battery or batteries from the battery inventory 326 that will have adequate capacity to satisfy the mission energy requirements.

The capacity of the batteries can be determined using the battery information from the battery monitoring system 321 and the battery database 322. In some cases, the exact capacity of a battery is not known (or is not readily determinable), but an approximate capacity can be determined from various data. For example, in one embodiment, the present capacity of a battery is approximated by using an initial capacity measurement (given by a manufacturer or measured by the battery monitoring system 321 via a full charge and discharge of the battery), and reducing that capacity measurement based on the number of charge/discharge cycles of the battery that have occurred since the measurement was taken, to obtain an approximate present capacity for the battery. The amount that the initial capacity measurement is reduced per charge/discharge cycle can be based on the amount of capacity reduction that was observed historically in similar batteries. In addition to the number of charge/discharge cycles, the approximated capacity for a battery can also be adjusted based on historical performance data for the battery and similar batteries, the temperature at which the battery was charged/discharged, etc.

Selection of batteries for an electric vehicle's mission using actual or predicted capacity is just one method of selection. In another embodiment, the battery manager 320 first determines batteries or combinations of batteries that have sufficient capacity to power the electric vehicle through the mission. Then, for those batteries that have sufficient capacity, the battery manager 320 further determines a predicted capacity degradation that will occur for each battery if that battery is used to power the mission. A battery or batteries can be selected for the mission by selecting a battery that will have the lowest predicted capacity degradation, or by selecting a battery that will have a predicted capacity degradation that is below a threshold capacity degradation. In one embodiment, if multiple batteries need to be selected for a mission—for example if a single battery does not have sufficient capacity to provide energy for the entire mission—N batteries can be selected by determining N batteries with predicted capacity degradation below a threshold, whose collective capacity is sufficient for the mission. The value of N need not be a fixed number, and can be determined based on the energy requirement and the capacity of the batteries. For example, if the mission energy requirement is 5 Amp-Hours, this requirement can be satisfied by two batteries, one with 2 Amp-Hours capacity and another with 3 Amp-Hour capacity. Alternatively, four batteries can satisfy the requirement, with each having 1.25 Amp-Hour capacity. If multiple sets of batteries can satisfy the energy requirement while remaining below the predicted capacity degradation threshold, then the set of batteries with the least predicted capacity degradation may be selected.

The predicted capacity degradation that will result for a battery as a result of the battery being used for a mission can be determined from various data in the battery information as well as the mission energy requirement. In one embodiment the predicted capacity degradation for each battery is determined based on the capacity of the battery, the amount that the battery will need to be charged for the mission (i.e., a predicted charge level), and the predicted amount that the battery will be discharged during the mission (i.e. a predicted discharge level). The amount that a battery needs to be charged and the amount that the battery will need to be discharged are based on the mission energy requirement.

Once a battery or batteries are selected for a particular mission, the battery manager 320 may send a signal to the battery interface system 324 and the battery automation system 325, indicating the selected batteries. The latter modules can take further action, as described below, based on the battery selection.

The battery interface system 324 provides a human-readable interface that can indicate the selected batteries in the battery inventory 326 to the distribution center operator 107, as well as display data related to the batteries in the battery inventory 326. The distribution center operator 107 can perform various tasks related to the selected batteries based on the indications. For example, the distribution center operator 107 can be informed via a human-readable indicator operated by the battery interface system 324 that a particular battery should be connected to a particular UAV 102 prior to placing that UAV 102 on the verification and launch system 303.

In one embodiment the battery interface system 324 comprises a number of human-readable indicators, each associated with a battery in the battery inventory 326, and a selected battery is indicated by activating a human-readable indicator associated with the selected battery. In one embodiment, the human-readable indicators associated with each battery are activatable lights (such as light emitting diodes (LEDs)). In another embodiment, the human-readable indicator associated with each battery are beepers, or some other sound-based indicator.

In another embodiment, the battery interface system 324 comprises a display such as a monitor or television screen, and the battery selection is indicated by means of displaying a list of identifiers associated with the selected batteries. For example, each battery in the battery inventory may be labeled with a serial number, and the battery interface system 324 may display a list of serial numbers associated with the selected batteries in order to identify the selected batteries.

The battery interface system 324 may also indicate information about batteries other than their selection status. For example, batteries that need to be removed from the inventory for repair or replacement may be indicated. Similarly, in one embodiment, the batteries in the battery inventory 326 are not always coupled to the battery monitoring system 321 and the battery charging system 323, and the battery interface system 324 may indicate to the distribution center operator 107 when the batteries need to be coupled to either of those systems. Other information related to the batteries may also be displayed, such as charge level, capacity degradation, voltage and amperage statistics, etc.

The battery automation system 325 is a system that helps to reduce the amount of manual labor required of the distribution center operator 107. The battery automation system 325 includes one or more devices that perform at least some of the tasks related to batteries in the battery inventory 326. For example, the battery automation system 325 may automatically perform one or more of the following battery related tasks: installing and removing batteries from an electric vehicle; coupling and uncoupling batteries from the battery charging system 323; and coupling and uncoupling batteries from the battery monitoring system 321. In one embodiment the battery automation system 325 comprises a robotic arm that performs automation tasks. In another embodiment, the battery automation system 325 and the battery charging system 323 are merged into a single device or system that can both charge batteries and install the charged batteries onto a UAV 102.

After the battery manager 320 selects one or more batteries for an electric vehicle's mission, the battery manager 320 may issue additional instructions to other modules in the battery management system 301 to prepare the batteries for the mission. For example, the battery manager 320 may instruct the battery charging system 323 to charge one or more of the selected batteries if their charge level is not sufficient to meet the mission energy requirement. Similarly, the battery manager 320 may issue instructions to the battery interface system 324 (to inform the distribution center operator 107) or the battery automation system 325, to couple specific selected batteries to the battery charging system 323, or to install specific selected batteries to an electric vehicle, here the UAV 102.

The battery manager 320 may also improve the battery selection process by gathering information before and after electric vehicle missions to determine if the predicted capacity degradation of batteries matched the actual capacity degradation for the batteries after missions. For example, the battery manager 320 may instruct the battery monitoring system 321 to take pre-mission readings of battery properties for selected batteries, such as the charge level, voltage at the electrodes, electrical current output, etc. These pre-mission properties may be stored in the battery database 322. The selected batteries may then be installed into an electric vehicle for its mission (e.g. they may be installed in a UAV 102 for a flight). When the electric vehicle returns to the distribution center 101 after its mission, the battery manager 320 may instruct the battery monitoring system 321 to measure post-mission properties (for the same battery properties) of the batteries in the electric vehicle. The pre-mission properties and the post-mission properties may be used to determine the actual capacity degradation that occurred during the mission. The predicted capacity degradation and the actual capacity degradation can then be compared to determine the accuracy of the model used to determine the predicted capacity degradation. The accuracy of the model can be improved by adjusting it based on the difference between the actual and predicted capacity degradation.

For example, in one embodiment, the predicted capacity degradation for a battery might be determined for a mission based on a computer model that takes the pre-mission charge level of the battery, and the mission energy requirement as input parameters. The computer model may, for example, calculate internally a prediction of the post-mission charge level of the battery based on the mission energy requirement. Since one way battery capacity degradation can be estimated is based on the amount of energy discharged by a battery, the difference between the pre-mission and predicted post-mission battery charge levels may be used to determine the predicted capacity degradation for the battery. After the mission is completed, the battery can be measured again to determine the actual charge level of the battery. If the predicted post-mission charge level is different than the actual post-mission charge level measured, then the way the computer model predicts the post-mission charge level can be adjusted appropriately. In this way, the computer model for determining the predicted capacity degradation can be updated or adjusted to improve accuracy in the future.

The battery manager 320 may also report the inventory levels of batteries and their current degradation level to the logistics system 308, so that replacement batteries can be requested when they are needed at the distribution center 101.

Figure 3C:
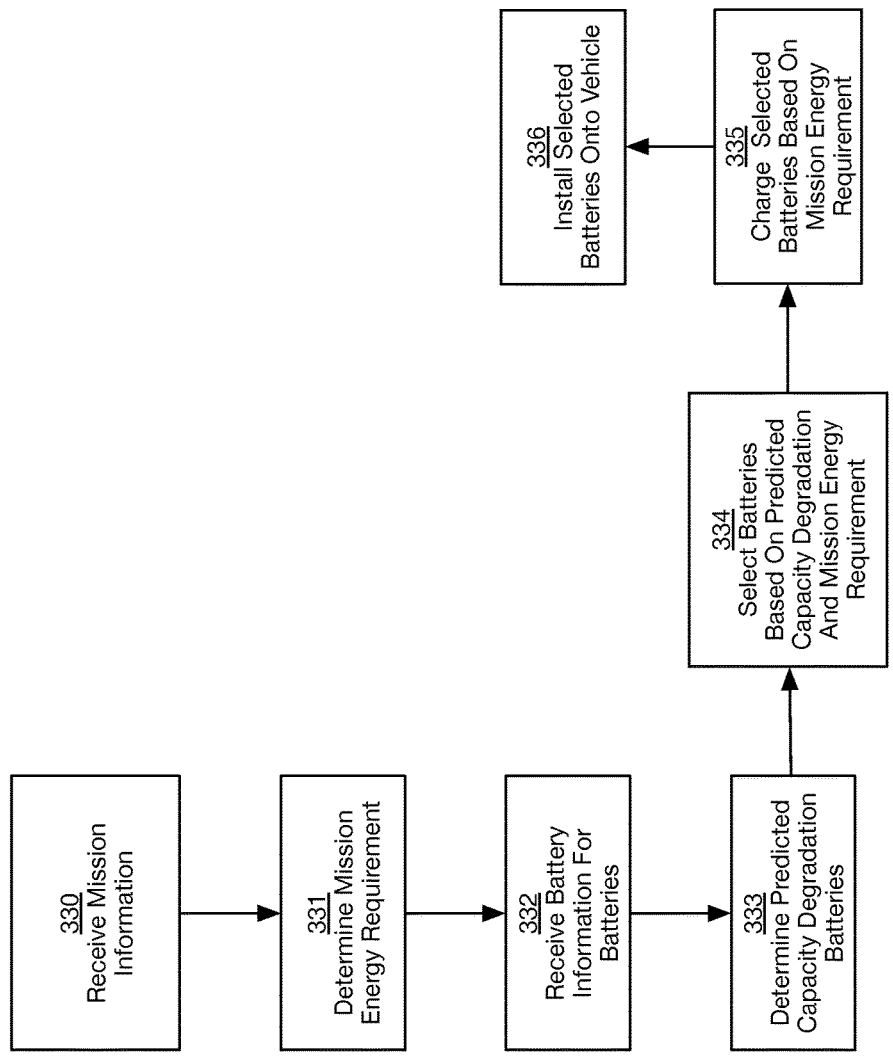
FIG. 3C is a diagram illustrating a process for selecting one or more batteries for an electric vehicle, according to one example embodiment.

FIG. 3C illustrates the process for selecting one or more batteries for an electric vehicle mission according to one example embodiment. The process begins when the battery manager 320 receives 330 mission information describing the parameters of the electric vehicle's mission and the local conditions. The mission information may include information from a service request, information about local weather conditions, as well as information about the electric vehicle and its payload. The mission information may be received from a module at the distribution center 101, such as the mission manager 305, or directly from the global services 103. In one embodiment the mission information may be received from a UAV 102 or a service requestor 104.

Once the mission information is received 330, the battery manager 320 determines 331 a mission energy requirement based on the mission information. The mission energy requirement is a prediction of how much stored energy the electric vehicle will require to safely complete its mission. For example, the mission energy requirement may be a prediction of the energy that a UAV 102 will use to fly from a distribution center 101 to a destination site 105 and back to the distribution center 101 (or another location), following a particular set of skymap flight corridors. The prediction can be determined through computer analysis of various relevant factors including the weight of the UAV 102 and its payload, the aerodynamic efficiency of the UAV 102's airframe, the distance of the route, the wind conditions, the efficiency and power of the UAV 102's motors, etc.

In one embodiment the battery manager 320 receives the mission energy requirement from another component or module of the UAS 100, instead of computing it based on the mission information.

The battery manager 320 receives 332 battery information for batteries in the battery inventory 326. The battery information includes current and historic properties of the batteries such as their voltage and output current at the electrodes, their temperature, their charge level, their nominal or actual rate of charge and discharge, their capacity, the state of their electrodes and electrolytes (e.g., quality, quantity, age, levels of corrosion, etc.), and the like. The battery information may be received from the battery monitoring system 321 and/or the battery database 322.

The battery manager 320 then determines 333 a predicted capacity degradation for the batteries in the battery inventory 326. As described earlier, the predicted capacity degradation may be determined based on the battery information describing the current state of the batteries and the mission energy requirement.

The battery manager 320 then selects 334 batteries from the battery inventory 326 based on the predicted capacity degradation and mission energy requirement. In one embodiment the battery manager 320 selects one or more batteries by selecting batteries that can in aggregate store enough energy (and provide sufficient peak power or current) to meet the mission energy requirement, and have the least predicted capacity degradation. In another embodiment the battery manager 320 selects one or more batteries by selecting batteries that can in aggregate store enough energy (and provide sufficient peak power or current) to meet the mission energy requirement, and have a predicted capacity degradation that is below a threshold amount (e.g., the batteries have a predicted capacity degradation less than 1% from their current capacity).

In an alternative embodiment, the battery manager 320 selects 334 batteries based on the energy storage capacity (and/or peak power or current output) of the batteries in the battery inventory 326 and the mission energy requirement, without regard to the predicted capacity degradation that will occur as a result of the mission, or to the present capacity degradation associated with the batteries.

Once the batteries are selected 334, the battery manager 320 will instruct the battery charging system 323 to charge 335 the selected batteries based on the mission energy requirement. The battery charging system 323 will not necessarily charge each selected battery to its full storage capacity. As batteries may experience unnecessary capacity degradation from charging and discharging, a set of selected batteries may be charged only as much as is necessary for each to provide a share of the total mission energy requirement, so that in aggregate the total mission energy requirement is met or exceeded by some safety margin.

Once charging 335 is completed, the selected batteries are installed 336 into the electric vehicle. The installation may be performed by the distribution center operator 107, or the battery automation system 325.

The structure and functionality of the distribution center 101 described above has been divided into modules based on one example implementation, but the functionality of various modules may be merged or further split such that there are more or fewer components than have been illustrated in FIG. 3A. For instance, it is possible to implement many parts of the distribution center management system 304, including the mission manager 305, battery manager 320, communications station 307, logistics system 308, and interface handler 311 on a single piece of computer hardware, such as a computer server or embedded SOC. Similarly, the different inventory management systems could be merged under a single inventory manager, while the verification and launch system 303 could be split into a separate verification system and launch system.

Global Services

The global services 103 are a collection of software services running on one or more computer servers, accessible through the Internet or another communications protocol. In one example embodiment, the global services 103 are software modules running on virtual machines in a third-party data center, such as Amazon Web Services or Google Cloud.

One purpose of the global services 103 is to provide a global infrastructure to coordinate, support, and manage multiple distribution centers 101, service requestors 104, and UAVs 102. However, in some embodiments, it is conceivable that the functionality of the global services 103 is provided by a local computer server, and that the server serves a local set of UAVs 102, distribution centers 101, and service requestors 104—possibly only a single one of each.

One or more global system operators 106 and remote vehicle operators 108 connect to the global services 103 and provide human intervention for systems that cannot be fully automated (or require temporary human assistance). The global system operators 106 and remote vehicle operators 108 typically connect to the global services 103 through control devices. A control device may be a computer workstation, a personal computer, a tablet device, a smartphone, or any other computing device that can communicate through a network with the global services 103. For instance, in one example embodiment, a global system operator 106 uses a laptop computer, with an Internet connection, to connect to the global services 103 executing on a computer server, which is also connected to the Internet.

Figure 4:
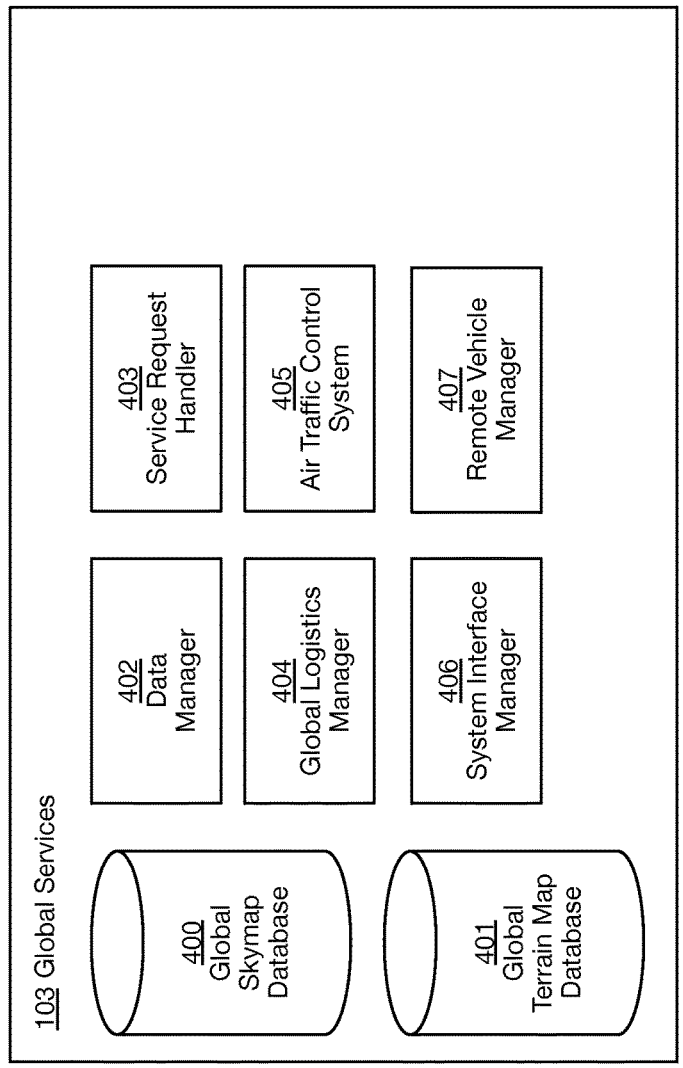
FIG. 4 is a diagram illustrating components of a global services system of a UAS, according to one example embodiment.

In the example embodiment illustrated in FIG. 4, the global services 103 are configured to serve a plurality of distribution centers 101, UAVs 102, and service requestors 104. In this embodiment, the global services 103 comprise a global skymap database 400, a global terrain map database 401, a data manager 402, a service request handler 403, a global logistics manager 404, an air traffic control system 405, a system interface manager 406, and a remote vehicle manager 407.

As discussed earlier, the global skymap database 400 and the global terrain map database 401 are global repositories for skymap and terrain map data in the UAS 100. As was the case with the local versions of these databases, the information in these databases can be represented in various ways depending on the needs of the UAS 100. Although these databases are represented as single units in the illustrated embodiment, in practice the databases may be implemented using several mirrored data stores to provide improved read speed, redundancy, and error recovery.

The data manager 402 manages data-writes into, and data-reads out of the global databases. For example, as updates to the local skymap databases 309 and local terrain map databases 310 are communicated to the global services 103, the data manager 402 ensures that the information is stored in the appropriate database and that the latest information is always available and is not overwritten by out-of-date information. The data manager 402 also manages information received from outside of the UAS 100 and integrates this information into the global databases. For instance, information received from third-party weather information providers, aviation authorities, and external air traffic controllers may be integrated into the global skymap database 400. Similarly, third-party topographical data, map imagery, and surveillance data may be integrated into the global terrain map database.

The data manager 402 also manages the updates sent to the local databases at each distribution center 101. In one embodiment, as the global skymap database 400 and global terrain map database 401 are updated, the data manager 402 will monitor the regions where those updates are relevant, and will send at least a portion of those updates to distribution centers 101 that are in the relevant regions. In another embodiment, the mission manager 305 at a distribution center 101 in a particular region will periodically request information about that region from the global services 103, and the data manager 402 will determine the set of information that is relevant to that region from the global databases, and will send that information to the distribution center 101, where the information may be integrated into the local databases. Similarly, a UAV 102 in flight may request information about its current location from the global services 103, and the data manager 402 may similarly determine the relevant information that should be sent back to the UAV 102 based on the UAV 102's location.

The service request handler 403 manages service requests sent by service requestors 104 that are received by the global services 103. When a service request is received by the global services 103, the service request handler 403 will communicate with the global logistics manager 404 to determine a distribution center 101 that is suitable for handling the service request locally. As mentioned previously, the selection of the distribution center 101 may take into account not only the location of a destination site 105 specified in the service request, but also the logistic requirements of the request, such as payload, UAV capability, etc. For instance, a service request may include information that specifies a payload type required to complete the request, and the distribution center 101 may be selected based on the availability of that payload type at various distribution centers 101.

The payload type may be specified directly by means of a payload identifier associated with a type of payload, or it may be specified by implication. For example, a camera payload may be specified by implication if the service request is a request for image data at the destination site 105.

In some embodiments, the service request handler 403 takes input from a global system operator 106 to determine the distribution center 101 that will be used to fulfill a service request.

Once the distribution center 101 and UAV 102 have been identified and reserved to fulfill a service request, the service request handler 403 may notify the service requestor 104 that the service request is in process. The service request handler 403 may also receive information from the distribution center 101 and/or the UAV 102 that allows a predicted time of mission completion to be estimated and sent to the service requestor 104.

The service request handler 403 is capable of communicating with the service requestor 104 via the system interface manager 406. A human service requestor 104 will typically send a service request to the global services 103 by means of some remote client device such as a mobile phone, a tablet, or a personal computer. The system interface manager 406 is capable of sending information to the client device operated by the service requestor 104 that is configured to be displayed on the client device. For example, in one embodiment, the system interface manager 406 functions as a web server, and the client device connects to the web server and displays a web page that is downloaded from the system interface manager 406. In this example, the service requestor 104 can receive and send information to the global services 103 via the displayed web page. In another embodiment, the system interface manager 406 exposes an application interface over the Internet (such as a representational state transfer, or "REST" interface), and an application running on the client device is configured to display information received from the global services 103 to the service requestor 104, and to send information inputted by the service requestor 104 back to the global services 103.

The service request handler 403 may also play an active part in determining the route a UAV 102 takes on a mission to complete a service request. For example, the service request handler 403 may use the system interface manager 406 to query a service requestor 104 for the precise location of the destination site 105, and the information provided by the service requestor 104 may be used to refine the flight route used by the UAV 102 in fulfilling the service request.

The structure and functionality of the global services 103, described above, has been divided into modules based on one example implementation, but the functionality of various modules may be merged or further split such that there are more or fewer components than have been illustrated in FIG. 4. For example, it is possible to merge the skymap and terrain map databases into a single data store. Some of the services illustrated can be moved outside the UAS 100, for example, the air traffic control system 405 and the global logistics manager 404 may be operated outside the UAS 100 as independent services, accessible through an Application Programming Interface (API). These and other changes to the structure do not change the overall architecture of the system, and systems with such changes may operate in the same or similar manner as the system disclosed.

The service request handler 403 utilizes the global logistics manager 404 to obtain information required for distribution center 101 and UAV 102 selection. The global logistics manager 404 tracks the inventory information in each local logistics system 308 at each distribution center 101. The global logistics manager 404 may proactively route additional stock to local distribution centers 101 when supplies of any inventory item are depleted, are below some threshold quantity, or are predicted to be depleted within some threshold time. The global logistics manager 404 may also notify a global system operator 106 in the event of an inventory shortage at a distribution center 101. The global system operator 106 may take actions outside the UAS 100 to route new inventory items to the distribution center 101, such as, for example, ordering and shipping items from a third-party warehouse.

In one embodiment, the global logistics manager 404 relocates UAVs 102 from a first distribution center 101 that has an excess of UAVs to a second distribution center 101 that has a shortage of UAVs. In this embodiment, the global logistics manager 404 may monitor the daily, monthly, or yearly patterns of service requests to determine the estimated UAV requirements at each distribution center 101 over a period of time. Based on these estimated UAV requirements, the global logistics manager 404 may preemptively relocate UAVs from one distribution center 101 to another. The relocation of UAVs 102 may be done using third-party shippers, or the relocation may be done by sending requests to the distribution centers 101 to launch UAVs 102 with destination sites 105 set to other distribution centers 101. As an optimization, these relocation flights may be scheduled during times when the service request volume is low, for example, late at night or during holidays.

The air traffic control system 405 is responsible for tracking the UAVs 102 and aircraft that are known to be in flight in the area served by the UAS 100. The air traffic control system 405 receives information from the distribution centers 101, the UAVs 102 in flight, and from third party air traffic information providers. The information received by the air traffic control system 405 includes the known positions of aircraft in the area of the UAS 100, as well as flight routes that are registered with the system. Distribution centers 101 and/or UAVs 102 may register flight routes for missions, with the air traffic control system 405. The air traffic control system 405 may also allow UAVs and aircraft operated by third parties to register their flight routes.

The air traffic control system 405 provides real-time information updates regarding the positions of aircraft and UAVs to UAVs 102 that are flying missions. Using this information, the mission planners 200 onboard the UAVs 102 may modify their flight routes to avoid colliding with other aircraft. The air traffic control system 405 may offer similar information updates to UAVs and other aircraft that are operating outside the UAS 100 in order to maintain a safer airspace for all aircraft operations.

The air traffic control system 405 also provides information to the service request handler 403 and the global logistics manager 404. Information from the air traffic control system 405 may be used to influence the selection of distribution centers 101 for service requests and the relocation of UAVs 102. For example, a service request may be routed away from distribution centers 101 where there is an excess of air traffic in the vicinity, and UAV relocation may be timed to avoid periods when air traffic is at its highest.

The remote vehicle manager 407 provides autonomous vehicles, such as the UAVs 102, with a human operator on demand. In the course of a mission, a UAV 102 may encounter a situation that its mission planner 200 or flight controller 201 cannot understand or safely handle. For example, an autonomous vehicle in an urban environment may not have the necessary routing and vision systems to handle path-determination and object avoidance in such a complex setting. Thus, an autonomous vehicle, such as a UAV 102, may fly under the control of its onboard mission planner 200 and flight controller 201 while in a relatively simple and uncluttered environment outside a city, but may then request human assistance once a city is entered.

We claim:

1. A method for selecting a battery for an electric vehicle, comprising:
    determining a predicted energy storage capacity degradation value of a battery by reducing an initial energy storage capacity value of the battery based at least on a number of charge cycles experienced by the battery;
    electronically receiving mission information describing a route to be travelled by the electric vehicle;
    electronically determining a mission energy requirement for the electric vehicle based at least partially on the mission information;
    selecting the battery from a plurality of batteries based at least on the predicted energy storage capacity degradation of the battery and the mission energy requirement;
    charging the selected battery based at least partially on the mission energy requirement; and
    installing the battery in the electric vehicle.

2. The method of claim 1, further comprising activating a human-readable indicator associated with the selected battery.

3. The method of claim 1, further comprising charging the selected battery based at least partially on the mission energy requirement.

4. The method of claim 1, wherein the predicted capacity degradation of the battery is determined based on a computer model that takes a charge level of the battery and the mission energy requirement as input parameters.

5. The method of claim 1, wherein reducing the initial energy storage capacity value of the battery based at least on the number of charge cycles experienced by the battery includes reducing the initial energy storage capacity value by a particular amount for each of the charge cycles.

6. The method of claim 5, wherein the particular amount is based on a reduction of energy storage capacity that was observed historically in similar batteries.

7. The method of claim 1, wherein determining the predicted energy storage capacity degradation value of the battery further comprises reducing an initial energy storage capacity value of the battery based at least on a temperate at which the battery was discharged.

* * * * *